United States Patent [19]

Basehore

[11] Patent Number: 5,425,131
[45] Date of Patent: Jun. 13, 1995

[54] MINIMUM COMPARATOR FOR FUZZY MICROCONTROLLER

[75] Inventor: Paul M. Basehore, Sanford, Fla.

[73] Assignee: American NeuraLogix Inc., Sanford, Fla.

[21] Appl. No.: 75,098

[22] Filed: Jun. 11, 1993

Related U.S. Application Data

[62] Division of Ser. No. 712,871, Jun. 12, 1991, Pat. No. 5,245,695.

[51] Int. Cl.$^6$ ....................... G06F 9/44; H03K 19/017
[52] U.S. Cl. ........................................ 395/3; 395/900; 340/146.2; 364/769
[58] Field of Search ............... 395/3, 900; 364/715.06, 364/769; 307/443, 494; 340/146.2

[56]        References Cited

U.S. PATENT DOCUMENTS

| | | | |
|---|---|---|---|
| 5,012,430 | 4/1991 | Sakurai | 395/61 |
| 5,073,867 | 12/1991 | Murphy et al. | 395/27 |
| 5,130,578 | 7/1992 | Stone et al. | 307/494 |
| 5,185,849 | 2/1993 | Miyazawa et al. | 395/3 |
| 5,227,678 | 7/1993 | Han et al. | 307/443 |

OTHER PUBLICATIONS

Sasaki et al., "Fuzzy Multiple-Input Maximum and Minimum Circuits in Current Mode and Their Analyses Using Bounded-Difference Equations," IEEE Trans. on Computers, Jun. 1990, 768–774.
Ruspini, "On the Semantics of Fuzzy Logic", International J. of Approximate Reasoning, vol. 5, Jan. 1991, pp. 45–88.
Mamdani, "Application of Fuzzy Algorithms for Control of Simple Dynamic Plant", Proceedings Institution of Electrical Engineers, London, vol. 121, No. 12, Dec. 1974, pp. 1585–1588.
Lee, "Fuzzy Logic in Control Systems: Fuzzy Logic Controller—Part I", IEEE Transactions on Systems, Man and Cybernetics, vol. 20, No. 2, Mar./Arp. 1990, pp. 404–418.
Devi et al, "Estimation of Fuzzy Memberships from Histograms", Information Sciences, vol. 35, 1985, pp. 43–59.
Braae et al, "Theoretical and Linguistic Aspects of the Fuzzy Logic Controller", Automatica, vol. 15, No. 5, 1979, pp. 553–577.
Zadeh, "Fuzzy Sets", Information and Control, vol. 8, 1965, pp. 338–353.
Tang, "Comparing Fuzzy Logic with Classical Controller Designs", IEEE Transactions on Systems, Man, and Cybernetics, vol. 17, No. 6, Nov./Dec. 1987 pp. 1085–1087.
Lee, "Fuzzy Logic in Control Systems: Fuzzy Logic Controller—Part II", IEEE Transactions on Systems, Man, and Cybernetics, vol. 20, No. 2 Mar./Apr. 1990, pp. 404–418.
Ralston et al, "Fuzzy Logic Control of Machining", Manufacturing Review, vol. 3, No. 3, Sep. 1990, pp. 147–154.

(List continued on next page.)

*Primary Examiner*—Robert W. Downs
*Attorney, Agent, or Firm*—Cushman, Darby & Cushman

[57]        ABSTRACT

An arrangement (apparatus and method) using fuzzy logic controls a plurality of devices in response to inputs. The time-division-multiplexed input signals are demultiplexed and fuzzified according to predetermined fuzzy sets. The fuzzified input signals are input to an asynchronous multipath feedforward network which determines a minimum rule term for each rule processed. The multipath feedfoward network is dedicated to processes the fuzzified input signals in parallel and to determine the minimum rule term using a minimum amount of circuitry. Parallel processing of the fuzzified input signals is accomplished using a plurality of minimizing elements. Significant Bits of minimizing element output signals are successively compared in a NAND tree and a resulting output is fed back to the input of each minimizing element. Upon stabilization the resulting output is the minimum rule term.

8 Claims, 15 Drawing Sheets

OTHER PUBLICATIONS

Lippmann, "An Introduction to Computing with Neural Nets", IEEE ASSP Magazine, Apr. 1987, pp. 4–21.

Zadeh, "Outline of a New Approach to the Analysis of Complex Systems and Decision Processes", vol. 3, No. 1, IEEE Transactions on Systems, Man, and Cybernetics, vol. 3, No. 1, Jan. 1973, pp. 28–44.

Kohoutek, "Practice of Approximate Reasoning", Proceedings of Manufacturing International '90, Atlanta, Ga., Mar. 25–28, 1990, vol. 5: Design, Reliability, and Education of Manufacturability, pp. 63–68.

Schwartz, "Fuzzy Tools for Expert Systems", AI Expert, vol. 6, No. 2, Feb. 1991, pp. 34–41.

Chiu et al, "A Fuzzy Logic Programming Environment for Real-Time Control", International Journal of Approximate Reasoning, 1988, pp. 163–175.

Watanabe et al, "A VLSI Fuzzy Logic Controller with Reconfigurable, Cascadable Architecture", IEEE Journal of Solid State Circuits, vol. 25, No. 2, Apr. 1990, pp. 376–382.

Zadeh, "Fuzzy Logic", Computer, Apr. 1988, pp. 83–93.

Togai et al, "Expert System on a Chip: An Engine for Real-Time Approximate Reasoning", IEEE Expert, Fall 1986, pp. 55–62.

Leung et al, "Fuzzy Concepts in Expert Systems", Computer, Sep. 1988, pp. 43–56.

Mizumoto et al, "Comparison of Fuzzy Reasoning Methods", Fuzzy Sets & Systems, 1982, vol. 8, pp. 253–283.

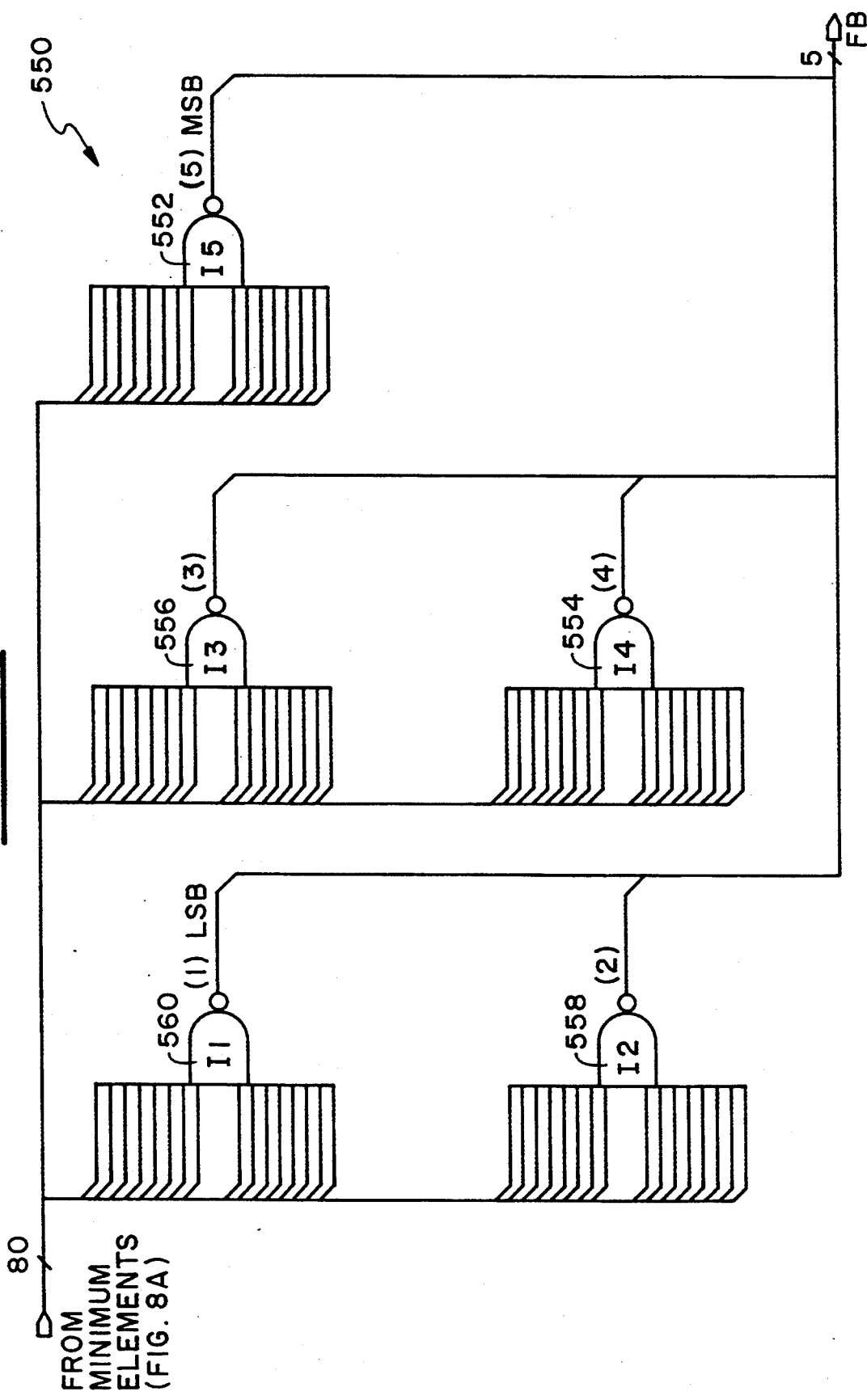

MINIMUM COMPARATOR FOR FUZZY MICROCONTROLLER

This is a division of application Ser. No. 07/712,871, filed Jun. 12, 1991, now U.S. Pat. No. 5,245,695, issued Sep. 14, 1993.

BACKGROUND OF THE INVENTION

1. Field of the Invention

The present invention relates to controllers and rule-based expert control systems using fuzzy logic and parallel processing for controlling devices.

2. Description of the Related Art

Control systems and computer-controlled electronic devices have historically been controlled by digital control systems. Such control systems use bi-state digital logic which requires a value of either "TRUE" or "FALSE", so that approximations are often required of real-world control problems. For example, an input/output relationship $y = f(x)$ would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function $y = f(x)$. If digital logic was used to characterize the function $y = f(x)$, it would be necessary to approximate the function shown in FIG. 1A by using discrete values, $y_i = a_i \cdot x_i$ ($i = 1, 2, \ldots, n$), as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function f(x) is approximated by a plurality of fuzzy sets 10 which overlap. Rather than approximating a continuous value x by a discrete value $x_i$, fuzzy logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy number may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc. Exemplary publications describing the theory and applications of fuzzy logic include Devi, B. B. et al., Estimation of Fuzzy Memberships from Histograms, Information Sciences, vol. 35, 1985, pp. 43-59; Braae, M. et al., Theoretical and Linguistic Aspects of the Fuzzy Logic Controller, Automatica, vol. 15, issue 5, 1979, pp. 553-77; Ralston, P. A. S., Fuzzy Logic Control of Machining, Manufacturing Review, vol. 3, no. 3, September 1990, pp. 147-154; Schwartz, Tom J., Fuzzy Tools for Expert Systems, AI Expert, February 1991, pp. 34-41; Kohoutek, H. J., Practice of Approximate Reasoning, Proceedings of Manufacturing International '90 (1990: Atlanta, Ga.) Vol. V: Design, Reliability, and Education of Manufacturability; Lee, Chuen C., Fuzzy Logic in Control Systems: Fuzzy Logic Controller—Parts I & II, IEEE Transactions on Systems, Man and Cybernetics vol. 20, issue 2, March/April 1990, pp. 404-418, 419-435; Mamdani, E. H., Application of Fuzzy Algorithms for Control of Simple Dynamic Plant, Proceedings of the IEEE, vol. 121, issue 12, December 1974, pp. 1585-1588; Tang, K. L. et al., Comparing Fuzzy Logic with Classical Controller Designs, IEEE Transactions on Systems, Man and Cybernetics, vol. 17, issue 6, November/December 1987, pp. 1085-1087; Zadeh, L. A., Fuzzy Sets, Information and Control, vol. 8, 1965, pp. 338-353; Zadeh, L. A., Outline of a New Approach to the Analysis of Complex Systems and Decision Processes, IEEE Transactions on Systems, Man and Cybernetics, vol. 3, issue 1, January 1973, pp. 28-44; and Ruspini, Enrique H., On the Semantics of Fuzzy Logic, International Journal of Approximate Reasoning 1991, vol. 5, pp. 45-86. These publications, which describe in detail the theory of fuzzy logic, are incorporated herein by reference.

The implementation of fuzzy logic for a controller has been suggested by Ralston et al. (1990). As shown in FIG. 2, a "universe of discourse" (e.g., a dimension of continuous values) is defined in step 20 for input and control variables. Membership functions are then defined in step 22 which determine the way observations of the variables are expressed as fuzzy sets. In other words, the fuzzy sets, which are subsets of the universe of discourse, are defined by their respective membership functions. A rule base is then formulated or constructed in step 24 to supply the logic that relates observations applied to the controller input to the required fuzzy control statements; a rule may have the format "IF (Alpha IS SMALL) AND (Beta IS MEDIUM) THEN Gamma IS BIG". A computational unit is then designed in step 26 that uses the rule base to logically obtain control statements from the fuzzy inputs; the computational unit will provide fuzzy outputs in response to the process observations, e.g., the fuzzy inputs. Finally, an action interface is defined in step 28 which will provide rules to translate fuzzy control statements into discrete, crisp values for the input variables applied to the input of the controlled device or process.

The implementation of fuzzy logic in control systems, while promising, has encountered numerous problems. For example, the construction of membership functions may be relatively difficult: the optimum membership function is related to sensor characteristics, control responses, and other dynamic factors. Thus, the determination of the optimum membership function in some cases may only be accomplished empirically. This difficulty in determining the membership function translates into the problem of properly classifying an input into the corresponding fuzzy set.

An additional problem of current fuzzy control systems is that the computational processing of the fuzzy logic is performed using conventional sequential processing via a microprocessor.

Such microprocessor-based systems use the classic von-Neumann architecture. Thus, the processing speed of the control system is limited by the processing speed of the microprocessor: this "von-Neumann bottleneck" severely limits processing speed as the required number of processing operations increases.

Highly parallel architectures which are faster than the von-Neumann architecture have recently been proposed by Lippman (1987). While these neural net classifiers are faster than the classic von-Neumann machine, the relatively large number of parallel connections in the neural net increases the size of an IC chip, and thus increases the overall cost of the system.

Finally, the fuzzy logic systems to date have only been implemented having a relatively small number of inputs. A fuzzy logic microcontroller must have the capacity to handle a large number of inputs, function in accordance with a large number of rules and provide an adequate number of outputs.

SUMMARY OF THE INVENTION

It is an object of the present invention to provide a low cost fuzzy logic microcontroller for efficient performance in cost-critical control systems.

It is a further object of the present invention to provide a fuzzy logic microcontroller which is easily implemented for desired control applications.

It is still a further object of the present invention to provide a fuzzy logic microcontroller which has an efficient processing capacity to generate control signals in response to a large number of inputs with minimum throughput.

In order to achieve these and other objects of the present invention, a fuzzy logic microcontroller includes several advantageous features which together provide efficient processing from a large number of inputs. The inputs are time-division multiplexed (TDM) signals, for example, from sensors, which are input to a fuzzifier input selector. The fuzzifier input selector separates the TDM signals and prepares the separated signals for fuzzification by the fuzzifier which determines a membership value for that input. After fuzzification, the fuzzified input signals are processed by a multipath feedforward network designed for higher processing speeds using a minimum number of components. The multipath feedforward network processes the fuzzified input signals in accordance with predetermined fuzzy logic rules established in accordance with the control system output parameters. The processed data is then output to the respective devices to be controlled.

The fuzzifier input selector according to the present invention demultiplexes the TDM input signals and stores the demultiplexed signal, preferably an eight (8) bit digital signal, into an input fuzzifier register corresponding to the demultiplexed signal. The input fuzzifier register is also loaded with fuzzy set parameter data for fuzzification. After the input fuzzifier register is loaded with the demultiplexed signal and the corresponding fuzzy Set parameter data, the demultiplexed signal undergoes fuzzification.

The present invention provides a fuzzification method which provides a simple technique for determining the similarity of the crisp input (e.g., the discrete demultiplexed signal undergoing fuzzification) to a fuzzy set. The degree of similarity between the crisp input and the fuzzy set is defined by a membership function $\mu$. The fuzzification method according to the present invention disregards the shape of the membership function $\mu$ and instead determines the distance of the crisp input from a defined center of the membership function $\mu$; the distance of the crisp input is then linearly complemented with respect to the width of the membership function $\mu$ so that the resulting similarity signal is a maximum when the distance is a minimum, and, conversely, a minimum when the distance is a maximum (e.g., when the crisp input exceeds the width of the membership function $\mu$).

Since the shape of the membership function is not used in the similarity determination, the designer of a control system no longer needs to be concerned with the optimum membership function shape or its effects due to sensor characteristics, control responses, or other dynamic factors. As a result, the fuzzification process according to the present invention is simpler to implement while retaining flexibility for variations in control systems.

The fuzzified input signals are processed by a multipath feedforward network which processes the fuzzified input signals in accordance with predetermined fuzzy logic rules established in accordance with control system output parameters. An output of the fuzzy microcontroller will be determined on the basis of its predetermined rules and the fuzzified input signals. A rule determines which of the fuzzified input signals are to be compared when processing the rule. The rule terms for each rule are implemented in the multipath feedforward network which determines in parallel the fuzzy input signals which represent the minimum value term in the rule. A maximum comparator then compares each of the minimum value terms for each rule to determine which rule provides the optimum output given the fuzzified inputs.

Since the multipath feedforward network according to the present invention is specially dedicated to determine a minimum, or maximum, rule term for each rule to be processed, the multipath feedforward network can process a plurality of selected fuzzified inputs for a given rule in parallel. Therefore, since a rule can be processed during each cycle of the network, the present invention enables extremely rapid rule processing on the order of thirty million rules per second. In addition, the dedicated network can be designed for minimum use of silicon on a semiconductor chip, resulting in a lower cost for the semiconductor chip.

The rule which provides the optimum output in response to the selected fuzzy data is addressed from a rule memory to provide a rule output to an output register. The output register operates the rule output on an existing output, e.g., by adding an offset, and outputs the resulting output signal to a device to be controlled. The resulting output signal, which is a defuzzified crisp signal, may also be fed back to the fuzzifier input selector to provide a feedback system.

Thus, the present invention provides a unique fuzzy microcontroller which enables rapid processing of a plurality of inputs using fuzzy logic and which is relatively simple and inexpensive to implement for fuzzy control systems.

As a result, the present invention provides a new and inexpensive system of control for applications such as smart appliances, pattern matching, sequencers, state machines and timers, automotive applications, robotics, approximate reasoning, or expert systems.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein:

FIGS. 8A, 8B and 80 disclose the minimum comparator of FIG. 3;

DETAILED DESCRIPTION OF THE PREFERRED EMBODIMENT

The preferred embodiment of the present invention will now be described with reference to the accompanying drawings.

Figure 3:
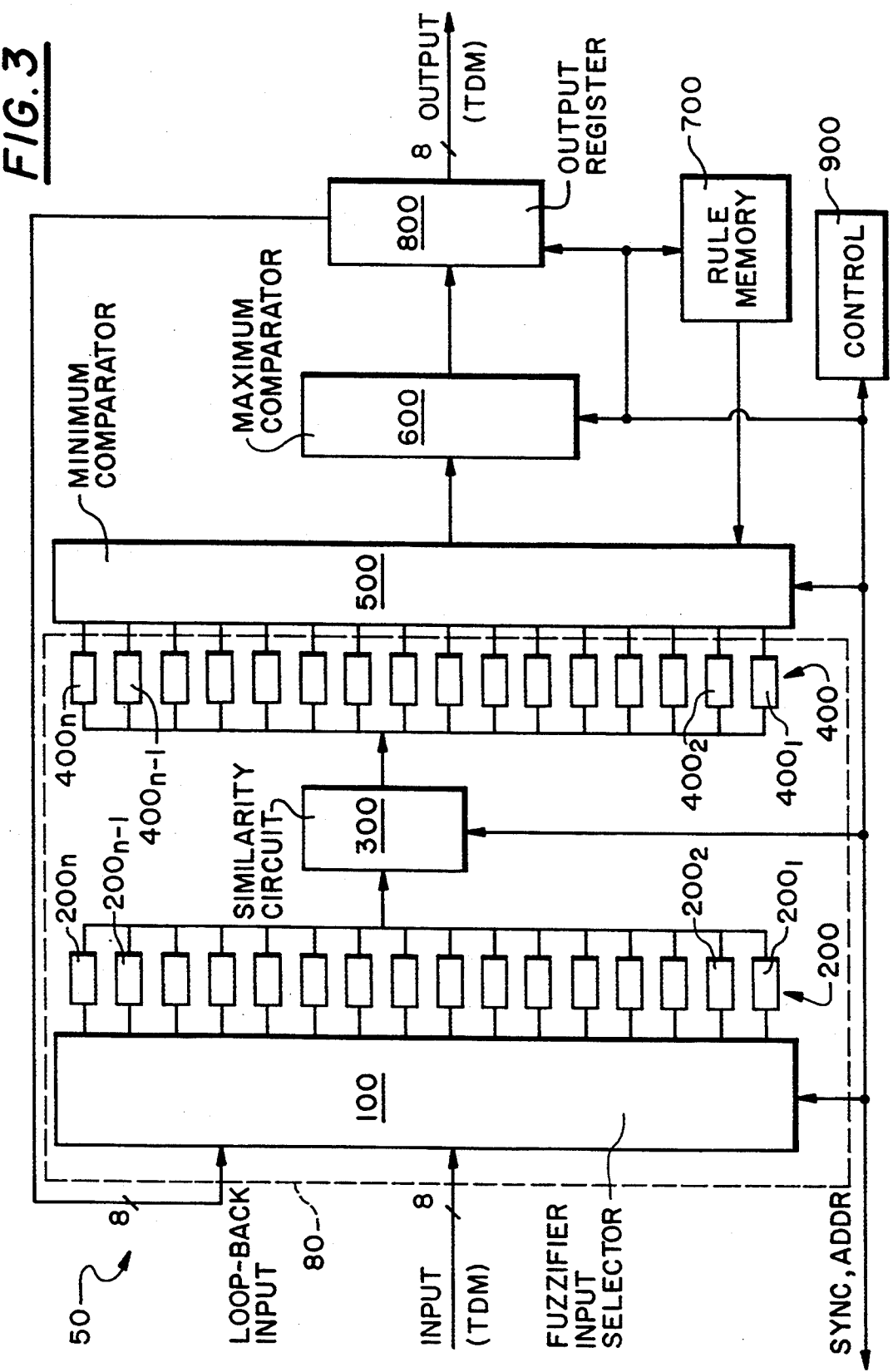
FIG. 3 discloses a block diagram of the fuzzy microcontroller according to a preferred embodiment of the present invention.

FIG. 3 discloses a block diagram of the fuzzy microcontroller according to a preferred embodiment of the present invention and designated generally by the reference character 50. The fuzzy microcontroller 50 may control a plurality of devices by outputting an output signal to a corresponding controlled device (not shown in FIG. 3). The value of the output signal is determined by the rules associated with the output signal and the signals input to the fuzzy microcontroller 50. In other words, each output signal is the result of a predetermined set of rules which define the action to be taken by the output signal under certain input conditions. The fuzzy microcontroller 50 of the present invention compares the input signals to each of the rules, one rule at a time, to determine which rule will provide the optimum output.

As shown in FIG. 3, the fuzzy microcontroller 50 includes a fuzzifier section 80 having a fuzzifier input selector 100 which receives a time-division-multiplexed (TDM) input signal from an external source. The external source may be a multiplexer (not shown) which time-multiplexes a plurality of sensor signals, for example. Although the input signal may be either analog or digital, the preferred embodiment uses an eight (8) bit digital word so that the fuzzifier input selector 100 receives a data stream of 8-bit digital input signals.

The fuzzifier input selector 100 receives the 8-bit TDM signal from the external multiplexer (not shown) with handshaking being performed between the external multiplexer and the control circuit 900 using a sync signal (SYNC) and an address signal (ADDR). The fuzzifier input selector 100 includes an eight-to-one demultiplexer, so that each of the 8-bit input signals are time-discrimated by the TDM signal and then latched internally. The latched input signals are then prepared by being mapped to one of the input fuzzifier registers 200, so that each of the input fuzzifier registers 200 stores one of the separate 8-bit digital input signals. The mapping process is predetermined, depending on the application to be performed, so that each of the 8-bit inputs are fuzzified according to the corresponding fuzzy set.

The number n of input fuzzifier registers 200 corresponds to the number of fuzzy sets. Each of the input fuzzifier registers 200 includes data necessary to fuzzify input data according to a predetermined fuzzy set. As a result, each input fuzzifier register 200, corresponds to a predetermined fuzzy set, so that the presence of sixteen input fuzzifier registers in the preferred embodiment enables the implementation of sixteen fuzzy sets. Thus, each of the input fuzzifier registers 200 includes both the necessary fuzzy set parameters (see below) and the 8-bit digital input signals to be fuzzified. The data from one of the input fuzzifier registers 200 is output to a similarity circuit 300, which performs the fuzzifying method of the present invention (as described below). The fuzzifying method is repeated for the contents of each of the input fuzzifier registers 200 until all the 8-bit input signals have been properly fuzzified.

The fuzzified input signals are output from the similarity circuit 300 and latched into fuzzifier output registers 400 sequentially. After all the input signals have been fuzzified according to the fuzzy set parameters stored in the input fuzzifier registers 200, the fuzzifier output registers 400 simultaneously output the fuzzified input signals to a minimum comparator 500. The minimum comparator 500 processes in parallel the fuzzified input signals in accordance with a predetermined fuzzy logic rule. The minimum comparator 500 determines whether the fuzzy logic rule has a likelihood of being executed on the basis of the fuzzified input signals. For example, a rule may be of the form "IF (Temp IS HOT) AND (Beta IS VERY_HUMID) AND (Motor IS LOW) THEN INCREMENT Motor BY BIG_INCREASE". Each of the terms (e.g., "Temp IS HOT") of the rule is compared with the corresponding fuzzy input (e.g., "Temp") to determine whether there is a low or high correlation. The correlations of each of the rule terms are then compared to determine the minimum level of correlation amongst the rule terms. The minimum rule term (e.g., the rule term having the minimum level of correlation) represents the overall likelihood of the rule being executed on the basis of the fuzzified input signals. The minimum comparator 500 determines the minimum rule term for each rule sequentially, for example, one rule at a time. The rules for each output are stored in a rule memory 700, so that after one rule is processed by the minimum comparator 500, another rule is selected from the rule memory 700 to determine the minimum rule term.

The minimum comparator 500 outputs the minimum rule term to a maximum comparator 600 to compare the minimum rule term of the selected rule with the minimum rule terms of other corresponding rules.

The maximum comparator 600 compares the rules of an output signal and identifies the rule which has the maximum value for the minimum rule term. The identified rule, selected as having the highest overall degree of correlation and, therefore, the optimum output, is addressed from the rule memory 700 and the corresponding rule output is provided to an output register 800. The rule memory 700 may be, for example, a 64×24 bit SRAM.

The output register 800 modifies the existing (or initial) output on the basis of the rule output provided. The modification by the output register 800 may be any logical operator (for example, increment, decrement, multiply, divide, complement, etc.). The output register 800 outputs the modified output as an output signal to the device to be controlled. If a feedback system is desired, the output register 800 can be selected to also output a loop-back input signal to the fuzzifier input selector 100.

According to the preferred embodiment, the output signal of the output register 800 is a TDM signal for eight (×8) output devices. Thus, the eight output signals are multiplexed into a single TDM signal. Also, a control circuit 900 controls all operations of the fuzzy microcontroller 50.

Figure 4:
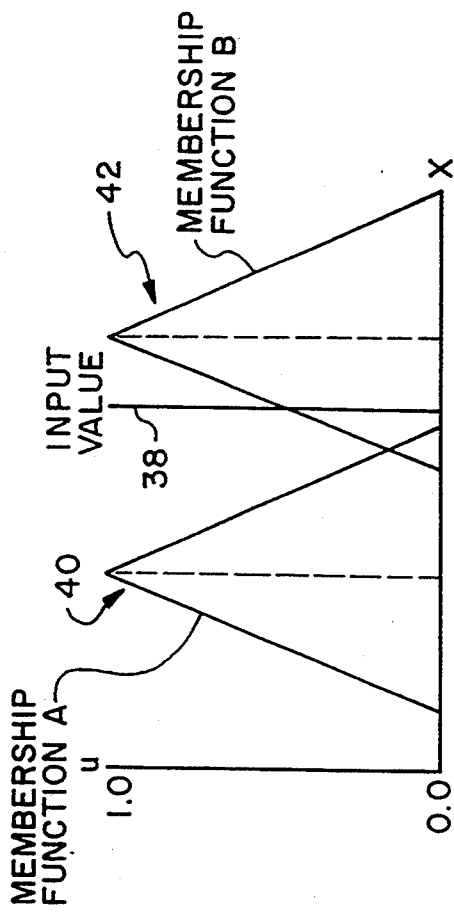
FIG. 4 illustrates a relationship between two fuzzy sets and a crisp input.

The fuzzifying method of the present invention will now be disclosed with reference to FIGS. 4 and 5A–5D. FIG. 4 illustrates a relationship between a crisp input 38 and two arbitrarily selected and exemplary fuzzy sets 40 and 42 having membership functions A and B. The term "crisp" refers to any input or output which yields a single, precise value. Since most sensors produce, and most actuators require, scalar values, the fuzzy microcontroller 50 of the present invention accepts crisp inputs and provides crisp outputs.

Figure 1A:
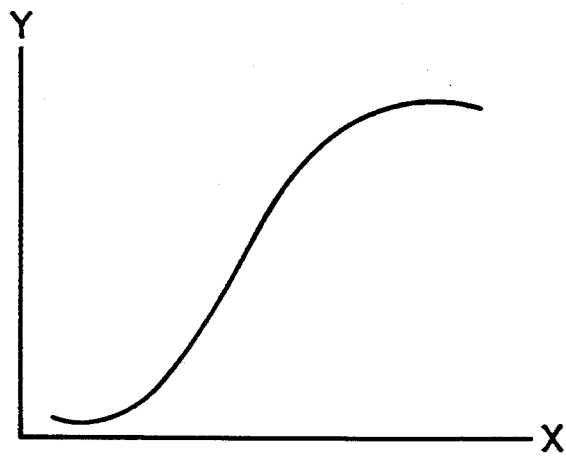
FIGS. 1A, 1B and 1C illustrate the logical distinctions between digital logic and fuzzy logic.
Figure 1B:
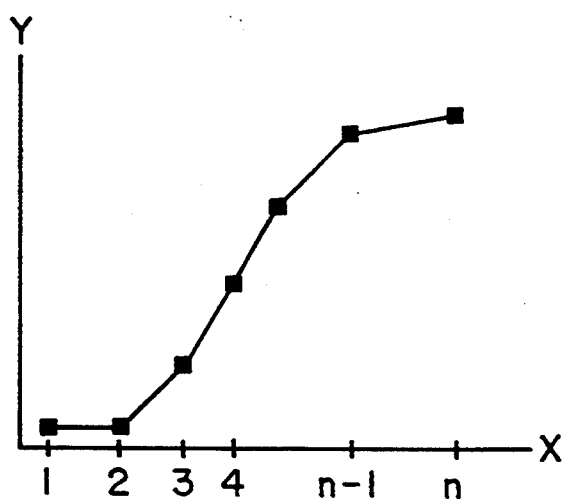
Figure 1C:
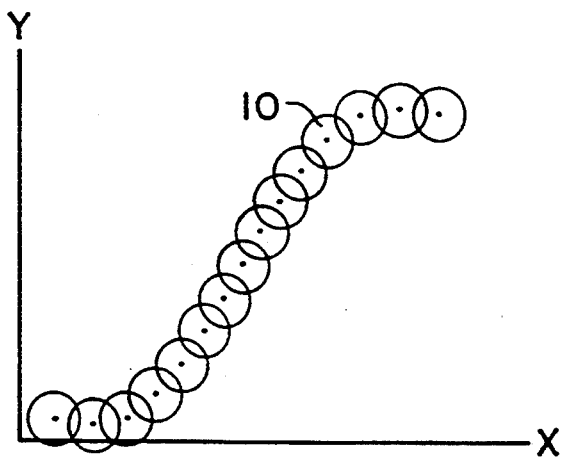
Figure 2:
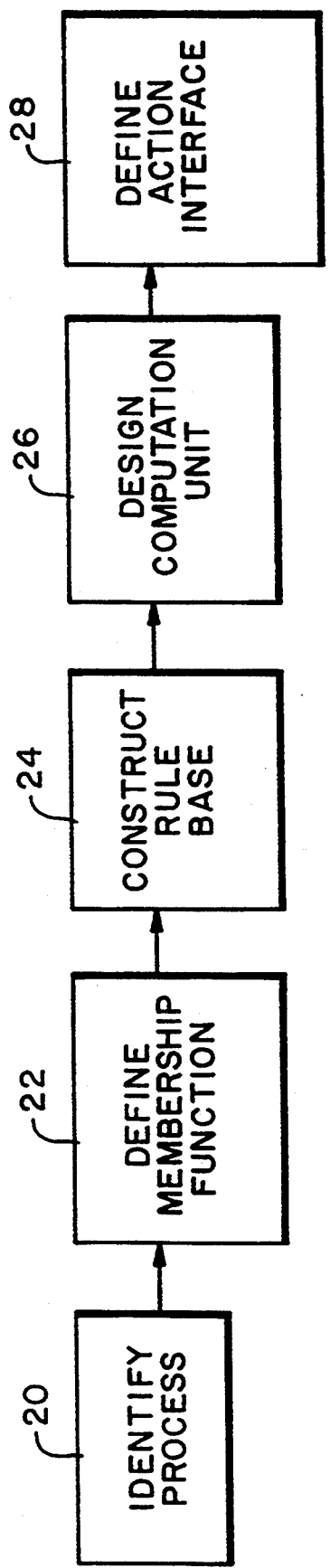
FIG. 2 discloses a conventional method for fuzzy logic in a controller.

Each membership function specifies a relationship between the crisp input 38 and the corresponding fuzzy set. In other words, the membership functions determine the size of the fuzzy sets 10 shown in FIG. 1C. The evaluation of the conjunction of the crisp input 38 with a membership function results in a "fuzzy term": the term represents the degree of membership or non-membership of the crisp input 38 in the corresponding fuzzy set. Since it is a fuzzy number, the term may be used in subsequent fuzzy rules, similar to Boolean operations.

Figure 5B:
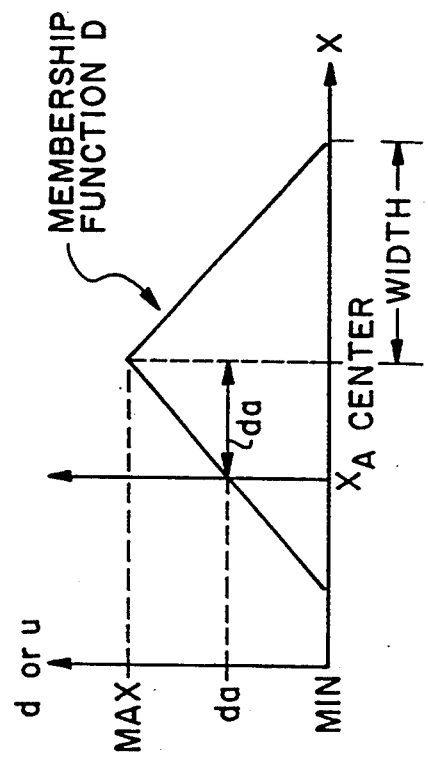
FIGS. 5A–5D illustrate the relationship between a fuzzy set and a range of inputs on the basis of the membership function of the fuzzy set according to the fuzzifying method of the present invention.
Figure 5A:
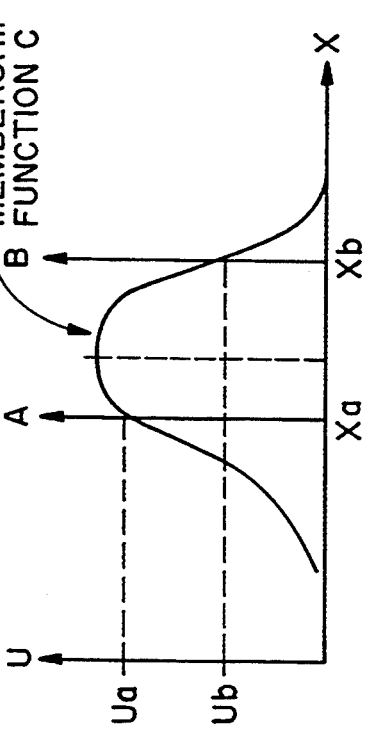

Thus, the membership function in a fuzzy system defines the degree of similarity between an unknown input and a known value or class (for example, the fuzzy set). As shown in FIG. 5A, the degree of membership $\mu_a$ for a crisp input A having a value $X_a$ occurs at the point where the crisp input A intersects the membership function C. However, due to nonlinearities in the control system (for example, sensor characteristics, control responses, dynamic responses) the membership function $\mu$ may be nonlinear relative to the input dimension X, making the determination of the membership function shape, and hence the similarity determination, difficult to implement.

In order to avoid the determination of the membership function shape, the fuzzifying method of the present invention predefines the slope of the membership function, and determines the distance between the crisp input and the center of the membership function. As shown in FIG. 5B, the membership function D is defined to be linear with a predetermined slope (for example, the slope is one-to-one). Rather than determining the intersection point of the membership function and the crisp input $X_A$, the fuzzifying method measures the distance da by subtracting the crisp input from the known center value and ignoring the sign. The difference is then complemented with respect to the width of the membership function D so that if the input and the center are the same, then the similarity value da is a maximum, whereas if the input is further from the center, the similarity value approaches a minimum.

Figure 5D:
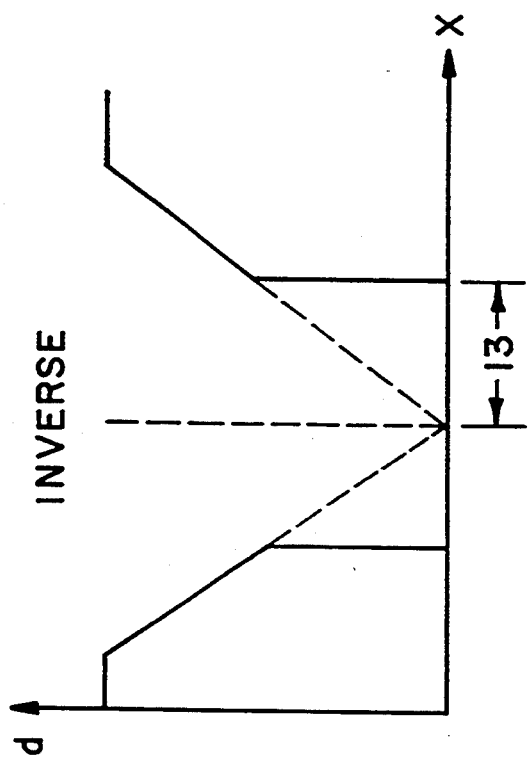
Figure 5C:
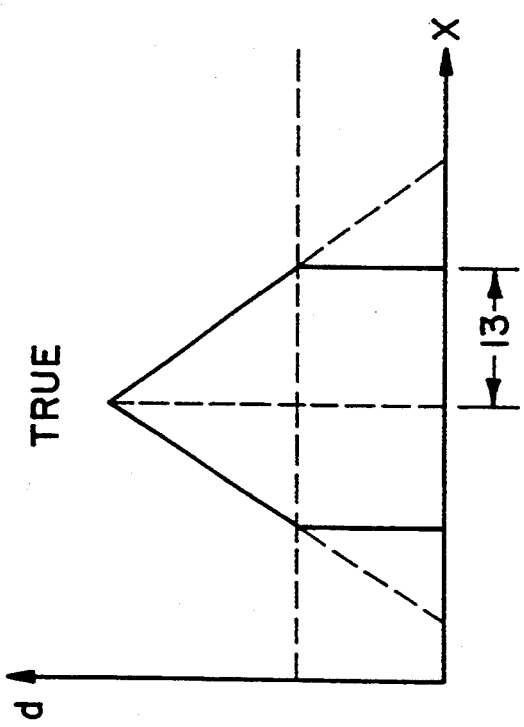

FIGS. 5C and 5D show a membership function and its inverse, respectively. The dashed lines extending from the membership function illustrate the shape of the membership function if the width was set at a maximum. In other words, although the width of the membership functions in FIGS. 5C and 5D are set at a value of "13" the maximum width according to the preferred embodiment is "31". Therefore, if a crisp input X was outside the membership function of FIG. 5C, the similarity value would be forced to the minimum or zero.

The advantages of the fuzzifying method of the present invention are that a designer of a control system is not required to determine a membership function shape for all fuzzy sets, and also that the fuzzifying method can be easily implemented in hardware. A preferred embodiment of the fuzzifying method is disclosed with reference to FIG. 7 (see below).

Figure 6:
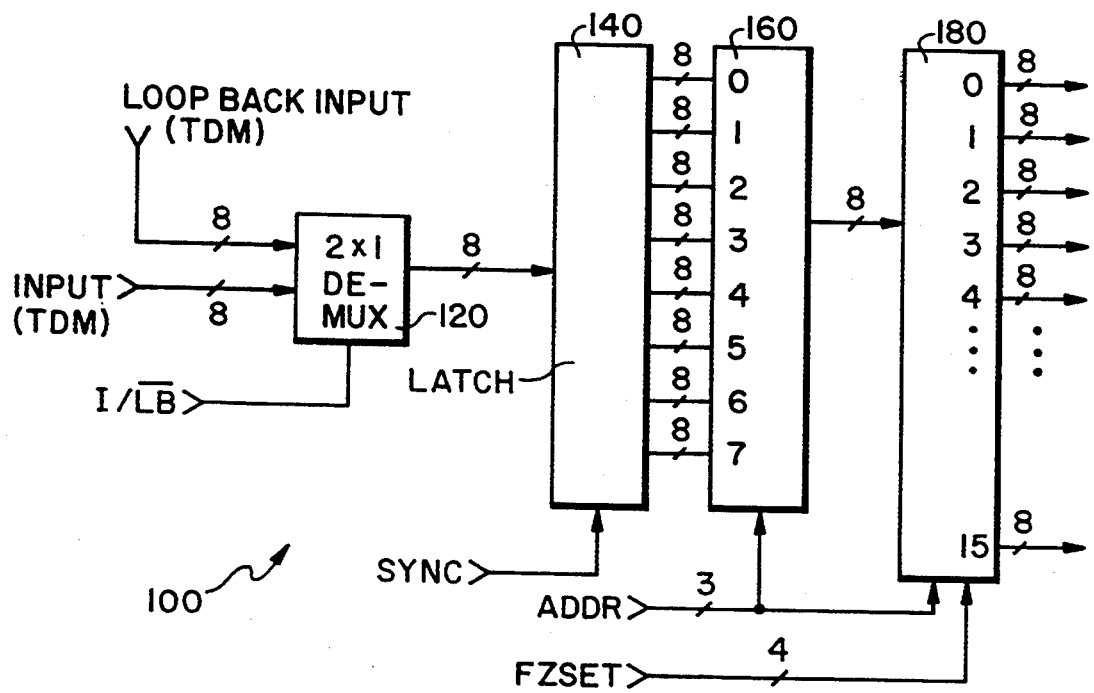
FIG. 6 discloses a block diagram of the fuzzifier input selector of FIG. 3.

FIG. 6 shows in detail the fuzzifier input selector 100 of FIG. 3. The TDM input signal from an external multiplexer is input to a two-to-one demultiplexer 120, which also receives a Loop Back Input signal from the output register 800 shown in FIG. 3. The two-to-one demultiplexer 120 selects either the TDM input signal or the Loop Back signal in response to an input/loopback selector signal (I/$\overline{\text{LB}}$). The selected signal is then output by the two-to-one demultiplexer 120 to a latch 140, which demultiplexes the selected TDM signal by latching each of the signals in response to a SYNC signal which is coupled also to the external multiplexer. Each of the eight input signals from the TDM signal are then provided to a selector circuit 160: the selector circuit 160 selects and outputs one of the eight input signals in response to a 3-bit ADDR signal. The output of the selector circuit 160 is mapped to a desired fuzzifier by a mapping circuit 180, which maps the selected input signal from the selector circuit 160 to one of the fuzzifier registers 200 in response to a FZSET signal which identifies the fuzzifier to be selected. After the fuzzifier is selected, the selected input signal is output the corresponding fuzzifier output line and latched to the corresponding one of the input fuzzifier registers 200 shown in FIG. 3.

As shown in FIG. 3, the fuzzifier input selector 100 receives a TDM input signal and a TDM loop back signal and selectively outputs the input signal to be fuzzified to the appropriate input fuzzifier registers 200. The control signals I/$\overline{\text{LB}}$, SYNC, ADDR and FZSET are each supplied by the control circuit 900 shown in FIG. 3, which provides all necessary addressing, timing, control, and overhead functions.

Figure 7:
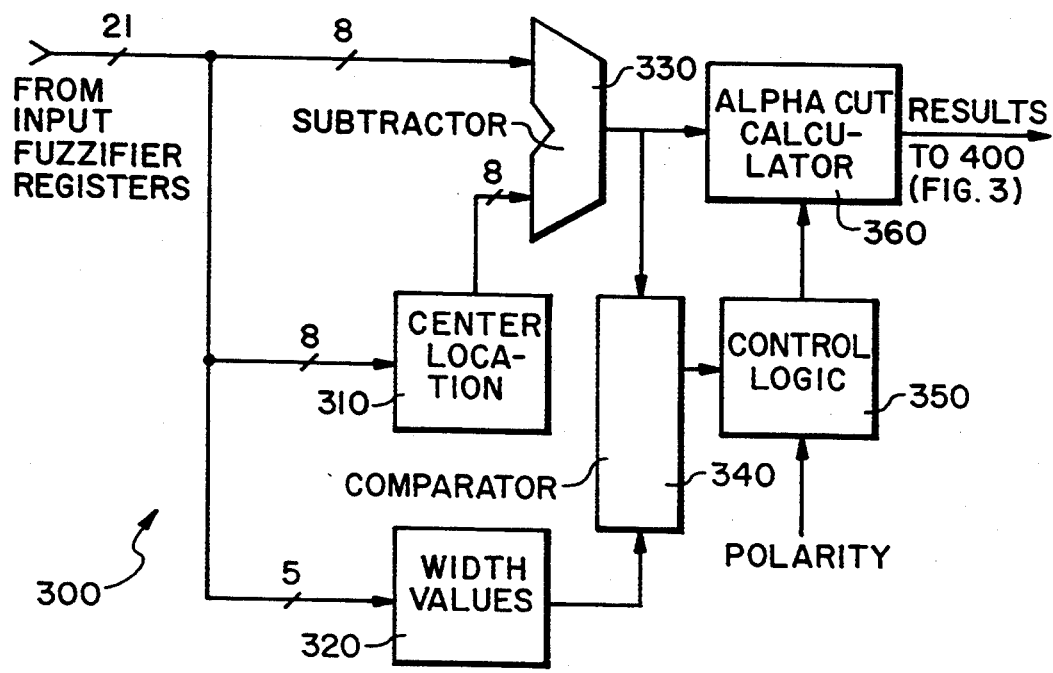
FIG. 7 discloses a block diagram of the similarity circuit of FIG. 3.

FIG. 7 shows the similarity circuit 300 of FIG. 3. The similarity circuit 300, also referred to herein as a "fuzzifier" determines the similarity of a crisp input to a selected fuzzy set using the fuzzifying method disclosed with reference to FIGS. 5B–5D. The similarity circuit 300 receives data from one of the input fuzzifier registers 200, which includes both the crisp input data and fuzzy set parameter data. According to the preferred embodiment, each of the input fuzzifier registers 200 is a 24-bit register having 8 bits for crisp input data, 8 bits for the center location of the fuzzy set-membership function, 5 bits for the width of the membership function, and 3 bits identifying the input addressed by the address signal (FIG. 6).

As shown in FIG. 7, the similarity circuit 300 receives the crisp input data and the fuzzy set parameter data for the center location and the width values. The 8-bit center location is latched into a 8-bit latch 310 and the width value is latched into a 5-bit latch 320. According to the fuzzifying method described above, the crisp input and the center location from the 8-bit latch 310 are passed to a subtractor 330, where the absolute difference is calculated. The difference value from the subtractor 330 is inputted to a comparator 340 and compared with the membership function width value stored in the 5-bit latch 320, and the result of the comparison is output to a control logic circuit 350. The control logic circuit 350 also receives a polarity bit from the control circuit 900: the polarity bit determines whether the crisp input will be fuzzified with respect to the true membership function or its inverse, as shown in FIGS. 5C and 5D, respectively.

The control logic circuit 350 outputs a control signal to an alpha cut calculator 360 in response to the result of the comparison from the comparator 340 and the polarity bit. Specifically, the alpha cut calculator 360 outputs the fuzzified data from the difference of the subtractor 330 using the following logic: if the crisp data is outside the membership function (e.g., the result of comparison indicates the difference value is greater than the width of the membership function), then the fuzzified value is forced to zero if the polarity bit is not set (e.g., membership function is "TRUE"); however, if the polarity bit is set, then the fuzzified value is forced to zero if the crisp data is inside the membership function.

In accordance with the fuzzifying method of the present invention, since the membership function has a one-to-one linear slope, the alpha cut calculator 360 takes the complement of the difference value and outputs the result as a similarity value, representing the degree of membership to the fuzzy set. The complement is determined as follows. According to the exemplary membership function presented in FIGS. 5C, the maximum width of the membership function is "31" decimal, so that if a crisp input had, for example, a value "CI=7", and a selected membership function had a center location "CL=13" decimal and a width "W=9", then the difference "DIFF=14−7=6" would be complemented to result in a similarity value "COMP(DIFF)=ABS(6−31)=25" decimal. Thus, the similarity value is "25" with the maximum value being "31" if the difference DIFF was zero. As a result, the fuzzifying method of the present invention provides a simple and effective method for similarity determination between a crisp input and a fuzzy set.

The similarity value is output from the alpha cut calculator 360 to the appropriate one of the fuzzifier output registers 400 as shown in FIG. 3. The similarity value, when referenced with its corresponding fuzzy set, is known as a fuzzy number.

The fuzzifying method is repeated for all the fuzzy sets. According to the preferred embodiment, a maximum of sixteen fuzzy sets are available with their parameters being stored in the input fuzzifier registers 200. However, modifications may be made to increase or decrease the number of fuzzy sets to be used.

After all the fuzzy numbers for their associated fuzzy sets are loaded into the fuzzifier output registers 400 (FIG. 3), the fuzzy microcontroller 50 processes the fuzzified input signals to determine whether a selected rule provides the optimum output given the fuzzy inputs. The processing is a two-step process: first, the minimum comparator 500 determines a minimum rule term of a selected rule; then, the maximum comparator 600 determines which of the rules corresponding to the desired output have the maximum value as a minimum rule term. The rule which has the maximum value for the minimum rule term is deemed the optimal output given the inputs.

The minimum comparator 500 receives those fuzzy inputs from the fuzzifier output registers 400 which are specified by the rule terms to be processed. In other words, a rule which uses only five of the sixteen fuzzy sets will only select those five corresponding fuzzy inputs for processing in the minimum comparator 500. The selected fuzzy inputs are processed by a multipath feedforward network specially dedicated for fast and efficient processing in order to find a minimum rule term for a rule. If a maximum rule term is desired, then the inputs would be inverted before processing.

Figure 8A:
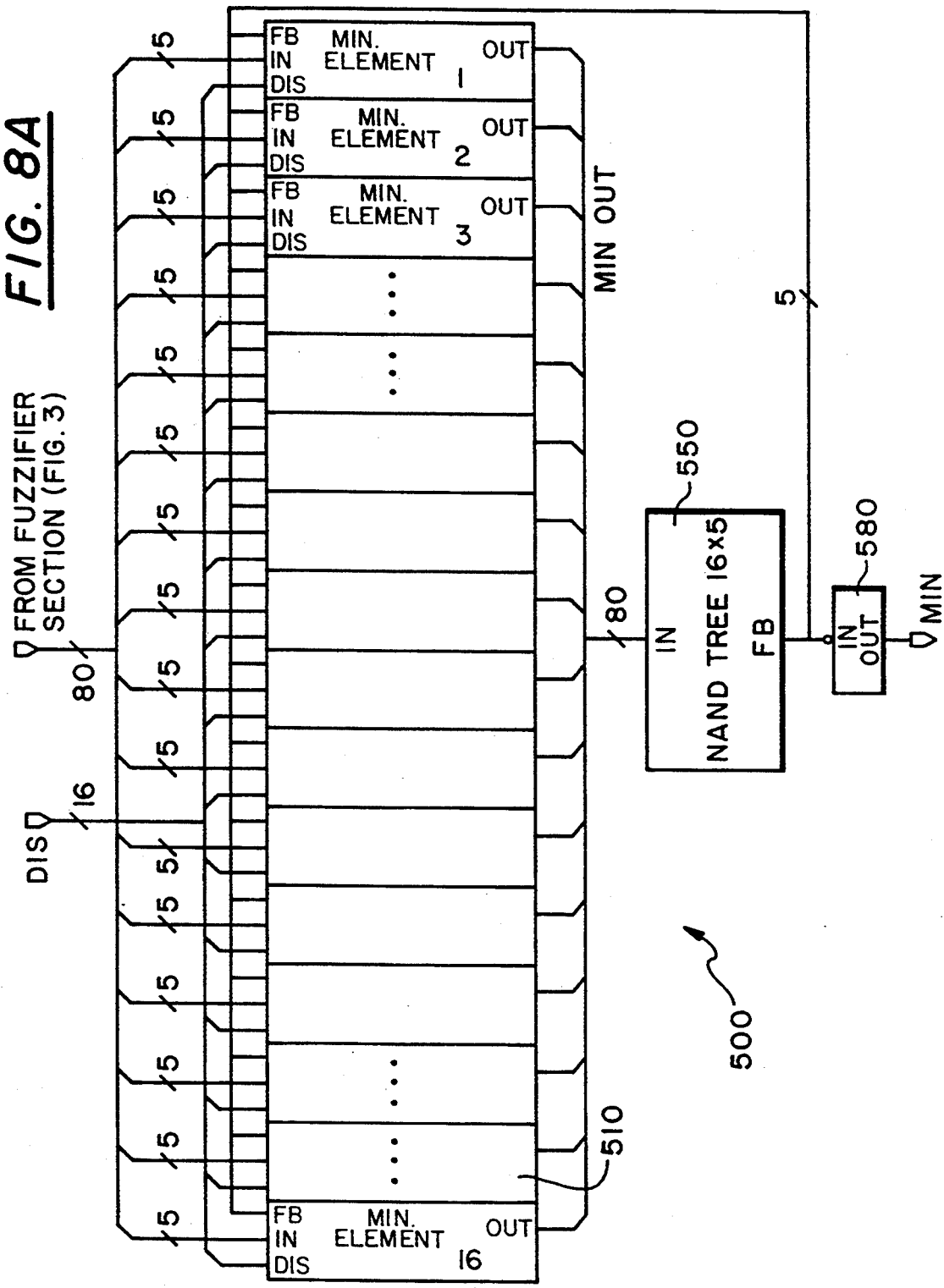

FIG. 8A shows a block diagram of the minimum comparator 500 shown in FIG. 3. The minimum comparator 500 is a multipath feedforward network specially designed to determine a minimum value among the sixteen five-bit values asynchronously. As a result, the minimum comparator 500 determines the minimum input value within one system clock cycle. The logic of the minimum comparator 500 is such that when, for example, two digital words are compared to determine which has the minimum value, the emphasis is placed on the higher order bits. As a result, if there exists a difference in a higher-order bit between the two words, the lower-bits can be disregarded. Therefore, the minimum comparator 500 first compares the higher-order bits of the values being compared, and inhibits all the lower bits when a mismatch is found.

Figure 8B:
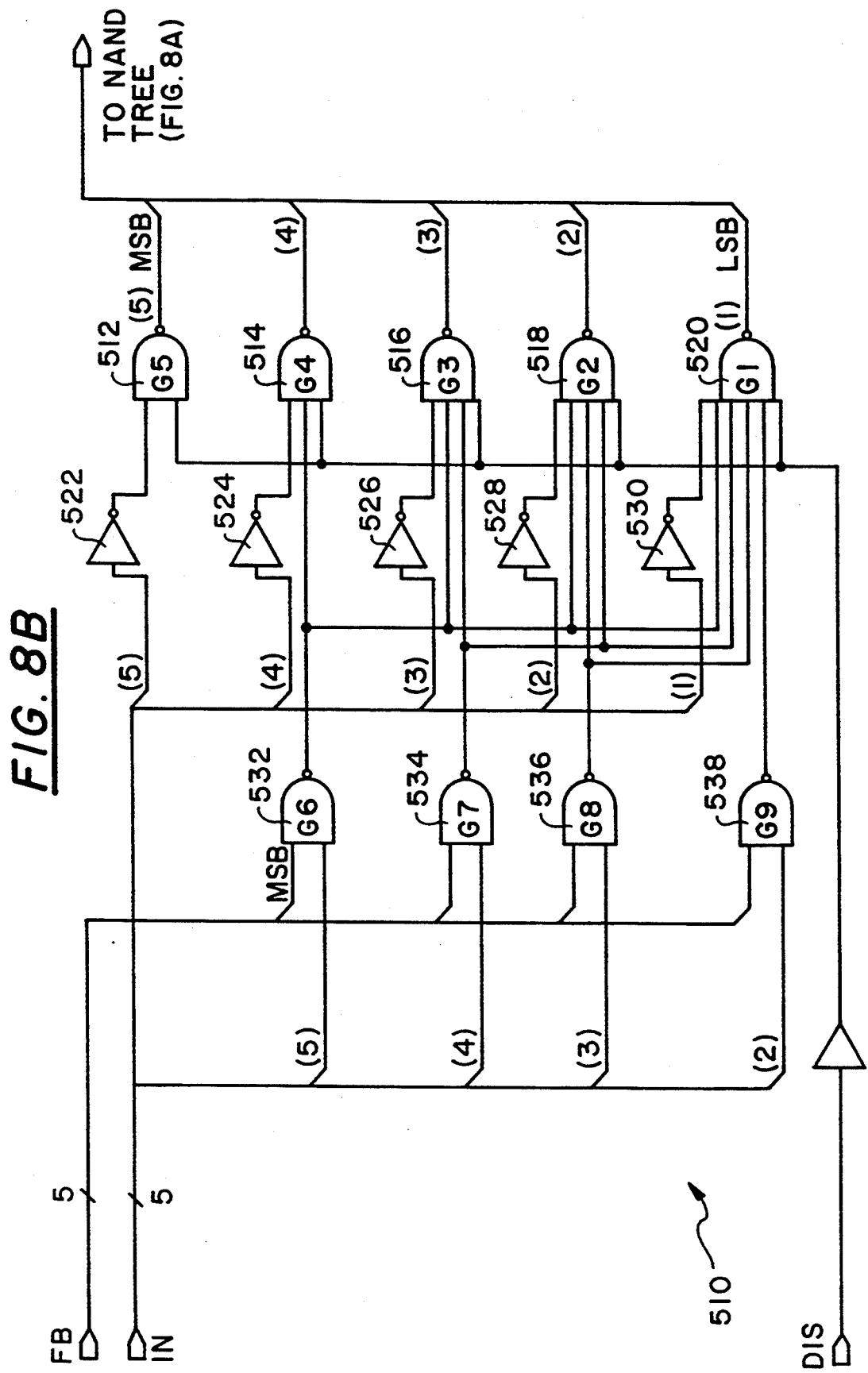

The functions of the minimum comparator 500 will become more apparent with the following description of the minimum comparator 500 with reference to FIGS. 8A, 8B and 8C.

As shown in FIG. 8A, the minimum comparator 500 receives the sixteen 5-bit (a total of eighty bits) fuzzified inputs from the fuzzifier output registers 400 and inputs each fuzzified input (IN) to a corresponding minimizing element 510, which also receives a feedback input (FB) from a NAND tree 550. The NAND tree 550 determines whether, for a given significant bit, any of the outputs from the minimizing element 510 have a different value for the corresponding significant bit. If there are any outputs which do not have the same value for the corresponding significant bit, the NAND tree 550 outputs a bit suppression signal as the feedback input (FB) to suppress the analysis of lower order bits in the minimizing element 510. After the array of the minimum elements 510 and the NAND tree 550 determine a stable value after multiple asynchronous passes as described below, the result is inverted by an inverter 580 to obtain the minimum.

Each minimizing element 510 receives the 5-bit fuzzified input (IN), the 5-bit feedback input (FB) and a disable input (DIS). The disable input is supplied in accordance with the rule being processed and stored in the rule memory 700. Therefore, if a rule uses only four fuzzy sets in its logic, the remaining minimum elements 510 would receive a disable signal DIS="1".

FIG. 8B discloses a minimizing element 510 from FIG. 8A. As shown in FIG. 8B, the disable signal (DIS) is input to a NAND gate G5 512, NAND gate G4 514, NAND gate G3 516, NAND gate G2 518 and NAND gate G1 520. The fuzzy signal IN is input to inverters 522, 524, 526, 528 and 530, whereby the inverter 522 receives the most significant bit (MSB) (also referred to as "Bit 5") and the inverter 530 receives the least significant bit (LSB) (also referred to as "Bit 1") of the fuzzy signal IN. Bits 5, 4, 3 and 2 of the fuzzy signal IN are also input to the NAND gate G6 532, NAND gate G7 534, NAND gate G8 536, and NAND gate G9 538, respectively. The NAND gate G6 532, NAND gate G7 534, NAND gate G8 536 and NAND gate G9 538 also receive the four most significant bits of the feedback signal FB, respectively, whereby the NAND gate G6 532 receives the MSB. The outputs of the inverter 522, inverter 524, inverter 526, inverter 528 and inverter 530 are supplied to the NAND gate G5 512, NAND gate G4 514, NAND gate G3 516, NAND gate G2 518 and NAND gate G1 520, respectively. In addition, the output of the NAND gate G6 532 is supplied to the NAND gate G4 514, NAND gate G3 516, NAND gate G2 518 and NAND gate G1 520; the output of the NAND gate G7 534 is supplied to the NAND gate G3 516, NAND gate G2 518 and the NAND gate G1 520; the output of the NAND gate G8 536 is supplied to the NAND gate G2 518 and the NAND gate G1 520; and the output of the NAND gate G9 538 is supplied to the NAND gate G1 520. The outputs of the NAND gate G5 512, NAND gate G4 514, NAND gate G3 516, NAND gate G2 518 and NAND gate G1 520 are combined and supplied to the NAND tree 550.

FIG. 8C shows in further detail the NAND tree 550 disclosed in FIG. 8A. As shown in FIG. 8C, the NAND tree 550 comprises a NAND gate I5 552, a NAND gate I4 554, a NAND gate I3 556, a NAND gate I2 558 and a NAND gate I1 560. The NAND gate I5 552 receives all the MSBs (also referred to as "Bit 5") from all the sixteen minimum elements 510 shown in FIG. 8A. The NAND gate I4 554 similarly receives Bit 4 from all the sixteen minimum elements 510; the NAND gate I3 556 receives Bit 3; the NAND gate I2 558 receives Bit 2; and the NAND gate I1 560 receives the LSBs Bit 1. The outputs of the NAND gates 552, 554, 556, 558 and 560 are combined and output as the feedback signal FB, the output of the NAND gate I5 552 representing the MSB and the output of the NAND gate I1 560 representing the LSB of the feedback signal FB.

The operation of the minimum comparator 500 will now be described with reference to FIGS. 8A, 8B and 8C. Each gate should have a uniform propagation delay; thus, the following time references (tn) refer to increments in time caused by gate propagation delays. The MSB of the input IN will be referred to as Bit 5, the LSB will be referred to as Bit 1, and the intermediate bits will be referred to herein as Bits 4, 3, and 2, respectively.

Assume that two of the minimum elements 510 receive inputs A and B, respectively, referred to as minimum element A and minimum element B. The input A has a fuzzy value of 18 decimal (10010 binary) and the input B has a fuzzy value of 19 decimal (10011 binary). The inputs A and B are simultaneously applied to the two minimum elements A and B at time t0, and all other minimum elements 510 are disabled by their respective disable (DIS) signal. Bit 5 of both inputs A and B is a logic "1", so that the output of the inverter 522 in both minimum elements A and B will be "0" at time t1. As a result, the corresponding NAND gates (G5) 512 will output a "1" at time t2. These two outputs are applied to the NAND gate I5 552 shown on FIG. 8C, which outputs a "0" at time t3 as the MSB of the FB signal, as shown in TABLE 1.

TABLE 1

| Time (Delay Intervals) | OUTPUTS | | |
|---|---|---|---|
| | Minimum Element A | Minimum Element B | NAND Tree |
| $t_1$ | Inverter 522 = 0 | Inverter 522 = 0 | X |
| $t_2$ | G5 = 1 | G5 = 1 | X |
| $t_3$ | | | I5 = 0 |
| $t_4$ | G6 = 1 | G6 = 1 | |
| $t_5$ | G4 = 0 | G4 = 0 | |
| $t_6$ | | | I4 = 1 |
| $t_7$ | G7 = 1 | G7 = 1 | |
| $t_8$ | G3 = 0 | G3 = 0 | |
| $t_9$ | | | I3 = 1 |
| $t_{10}$ | G8 = 1 | G8 = 1 | |
| $t_{11}$ | G2 = 1 | G2 = 1 | |
| $t_{12}$ | | | I2 = 0 |
| $t_{13}$ | G9 = 1 | G9 = 1 | |
| $t_{14}$ | G1 = 0 | G1 = 1 | |
| $t_{15}$ | | | I1 = 1 |

The Bit 5 of the FB signal and Bit 5 (logic 1 for inputs A and B) of the IN signal are applied to the NAND gates (G6) 532 for both minimum elements A and B, causing the NAND gates (G6) 532 to output a "1" at time t4. The output of NAND gates (G6) 532 enables the NAND gates (G4) 514 for both minimum elements A and B, each of which output Bit 4 (logic 0 for inputs A and B) of the corresponding input signal IN at time t5. The outputs of the NAND gates (G4) 514 are input to the NAND gate I4 554 in FIG. 8C, which outputs a "1" at time t6 as Bit 4 of the FB signal, as shown in TABLE 1.

As shown in FIG. 8B, the Bit 4 of the FB signal and Bit 4 of the IN signal are applied to the NAND gates (G7) 534 for both minimum elements A and B, causing the NAND gates (G7) to output a "1" at time t7, thereby enabling the NAND gates (G3) 516 for both minimum elements A and B. The NAND gates (G3) 516 both output Bit 3 (logic 0 for inputs A and B) at time t8. The outputs of the NAND gates (G3) are input to the NAND gate I3 556 in FIG. 8C, which outputs a "1" at time t9 as Bit 3 of the FB signal, as shown in TABLE 1.

As shown in FIG. 8B, the Bit 3 of the FB signal and Bit 3 of the IN signal are applied to the NAND gates (G8) 536 for both minimum elements A and B, causing the NAND gates (G8) to output a "1" at time t10, thereby enabling the NAND gates (G2) 518 for both minimum elements A and B. The NAND gates (G2) 518 both output Bit 2 (logic 1 for inputs A and B) at time t11. The outputs of the NAND gates (G2) are input to the NAND gate I2 558 in FIG. 8C, which outputs a "0"

at time t12 as Bit 2 of the FB signal, as shown in TABLE 1.

As shown in FIG. 8B, the Bit 2 of the FB signal and Bit 2 of the IN signal are applied to the NAND gates (G8) 536 for both minimum elements A and B, causing the NAND gates (G8) to output a "1" at time t13, thereby enabling the NAND gates (G1) 520 for both minimum elements A and B. The NAND gates (G1) 520 both output Bit 1 (logic 0 for input A; logic 1 for input B) at time t14. The outputs of the NAND gates (G1) are input to the NAND gate I1 560 in FIG. 8C, which outputs a "1" at time t15 as Bit 1 of the FB signal, as shown in TABLE 1.

Thus, at time t15 the asynchronous operation of the minimum elements A and B, as well as the NAND tree 550, is complete, and the minimum comparator 500 is deemed to have "stabilized". The output FB from the NAND tree 550 includes the inverse (1's complement) of the minimum value, namely FB=01101. The output signal FB is supplied to an inverter 580 which inverses (1's complement) the FB signal and outputs the minimum signal MIN, whereby MIN=10010.

As a result, the minimum comparator 500 determined the minimum between input A (10010) and input B (10011) to be MIN=10010. The maximum time interval to determine the minimum will be when the difference between the inputs is found solely in the least significant Bit 1. However, since the inputs are processed in parallel, the time interval for determining the minimum is not affected if more than two inputs are processed. Rather, since the time interval to determine the minimum is dependent on the propagation delay, the use of semiconductor devices having small propagation delays enable a minimum determination, even with all sixteen inputs, within 30–40 nanoseconds. Thus, the minimum value can be quickly determined, regardless of the number of inputs.

The minimum determination time interval is even smaller if higher significant bits are different, since the lower order bits are automatically suppressed. The following example illustrates how the time interval for determining the minimum value is reduced.

Assume that two of the minimum elements 510 receive inputs C and D, respectively, referred to as minimum element C and minimum element D. The input C has a fuzzy value of 11010 binary and the input D has a fuzzy value of 10000 binary. The response of the minimum comparator 500 is identical to the response with inputs A and B, as described above, up to time t5, where the NAND gates (G4) 514 are enabled and Bit 4 for the respective signals IN (logic 1 for C; logic 0 for D) are output to the NAND gate I4 554 in FIG. 8C. Since the Bit 4 for signals C and D are different, the NAND gate I4 554 outputs a "1" at time t6 as Bit 4 of the FB signal.

At time t6, Bit 4 of the FB signal and Bit 4 of the IN signal are applied to the NAND gates (G7) 534 for both minimum elements C and D. Note that Bit 4 of the FB signal is a "1", whereas Bit 4 of the input signal C (IN) is a "1" also; as a result, the NAND gate (G7) 534 for minimum element C outputs a "0" at time t7, which disables the NAND gates (G3, G2 and G1) 516, 518 and 520 by forcing their output to a "1" at time t8.

At the same time t6, Bits 2, 3 and 4 of the input signal D (IN) are all "0"; as a result, all the NAND gates (G7, G8 and G9) 532, 534 and 536 are forced to output a "1" at time t7. As a result, since the NAND gates (G3, G2 and G1) 516, 518 and 518 of the minimum element D each are input a "1" from the inverted IN signal and a "1" from the corresponding NAND gate, the NAND gates (G3, G2 and G1) 516, 518 and 518 of the minimum element D each output a "0" at time t8.

Thus, at time t8, as shown in FIG. 8C, the NAND gate I3 556, the NAND gate I2 558 and the NAND gate I1 560 receive the respective inputs from the NAND gates of minimum elements C and D shown in FIG. 8B. The outputs from the NAND gates of minimum element C are "1" and the outputs from the NAND gates of minimum element D are "0", so that the NAND gate I3 556, the NAND gate I2 558 and the NAND gate I1 560 each output a "1" as the respective bits of the FB signal at time t9. As a result, the FB signal is FB=01111. As shown in FIG. 8A, when the FB signal passes through the inverter 580, the minimum signal MIN is MIN=10000, which is the value of input D. Table 2 summarizes the process of finding the minimum between inputs C and D.

TABLE 2

| Time (Delay Intervals) | OUTPUTS | | |
|---|---|---|---|
| | Minimum Element A | Minimum Element B | NAND Tree |
| t₁ | Inverter 522 = 0 | Inverter | X |
| t₂ | G5 = 1 | G5 = 1 | X |
| t₃ | | | I5 = 0 |
| t₄ | G6 = 1 | G6 = 1 | |
| t₅ | G4 = 0 | G4 = 0 | |
| t₆ | | | I4 = 1 |
| t₇ | G7 = 0 | G7 = 1 | |
| t₈ | G3 = 1 | G3 = 0 | |
| | G2 = 1 | G2 = 0 | |
| | G1 = 0 | G1 = 1 | |
| t₉ | | | I3 = 1 |
| | | | I2 = 1 |
| | | | I1 = 1 |

As a result, the minimum between inputs C and D was found at time t9, which represents the time duration of nine propagation delays within the minimizing element 510 and the NAND tree 550. As a result, the stabilization time of the minimum comparator 500 will be a maximum of time t15, and may be reduced depending on the different input conditions.

It should be realized that the minimum comparator 500 according to the present invention may also be implemented in the form of a neural network having feedback capabilities. Specifically, a three-layer neural network may be implemented, wherein the first layer includes the functions of the NAND gate G5 512, NAND gate G4 514, NAND gate G3 516, NAND gate G2 518 and NAND gate G1 520 and the corresponding inverters 522, 524, 526, 528 and 530. The second neural layer would include the functions of the NAND tree 550 as shown in FIG. 8C, and the third neural layer would include the functions of the NAND gate G6 532, NAND gate G7 534, NAND gate G8 536 and NAND gate G9 538. According to this variation, it will be recognized that the output signal FB will actually be output from the middle layer as described above, and that the third layer would feed back to the first layer to enable or inhibit inputs.

The multipath feedforward network of the minimum comparator 500 has been designed with the objectives of providing the fastest determination of a minimum/maximum using the least complex circuitry to minimize cost.

Since the multipath feedforward network according to the present invention is specially dedicated to determine a minimum, or maximum, rule term for each rule to be processed, the multipath feedforward network can process a plurality of selected fuzzified inputs for a given rule in parallel. In addition, the multipath feedforward network operates asynchronously, without the necessity of an external clock. Therefore, since a rule can be processed during each cycle of the network, the present invention enables extremely rapid rule processing on the order of thirty million rules per second. In addition, the dedicated network can be designed using simple logic elements for minimum use of silicon on a semiconductor chip, resulting in a lower cost for the semiconductor chip.

Figure 9:
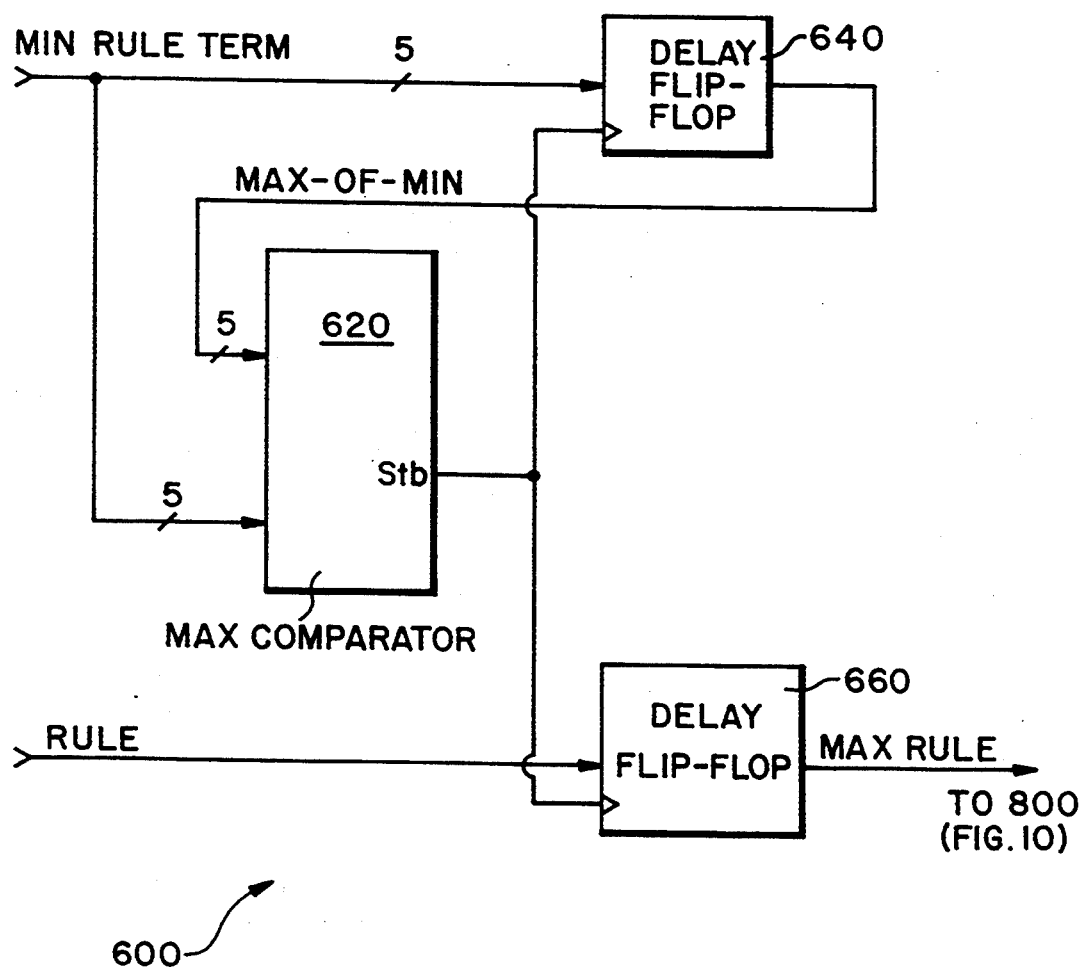
FIG. 9 discloses the maximum comparator of FIG. 3.

FIG. 9 discloses the maximum comparator 600 of FIG. 3. The MIN RULE TERM signal is output from the minimum comparator 500 as the minimum rule term for a given processed rule. The processed rule is identified by the signal Rule, which is input from the control circuit 900. The MIN RULE TERM signal is input to a maximum comparator circuit 620, which compares the MIN RULE TERM signal with a previously stored Max-of-Min signal from a delay flip-flop 640. If the MIN RULE TERM is greater than the Max-of-Min signal, the maximum comparator circuit 620 outputs a strobe signal (Stb). When the strobe signal is received, the delay flip-flop 640 is updated with the MIN RULE TERM which becomes the new Max-of-Min. Also, the Rule which corresponds to the new Max-of-Min is stored in a delay flip-flop 660. After all the rules for a given output have been processed, the delay flip-flop 660 outputs to the output register 800 a Max Rule signal which represents the rule having the optimum output for the fuzzy input data.

Figure 10:
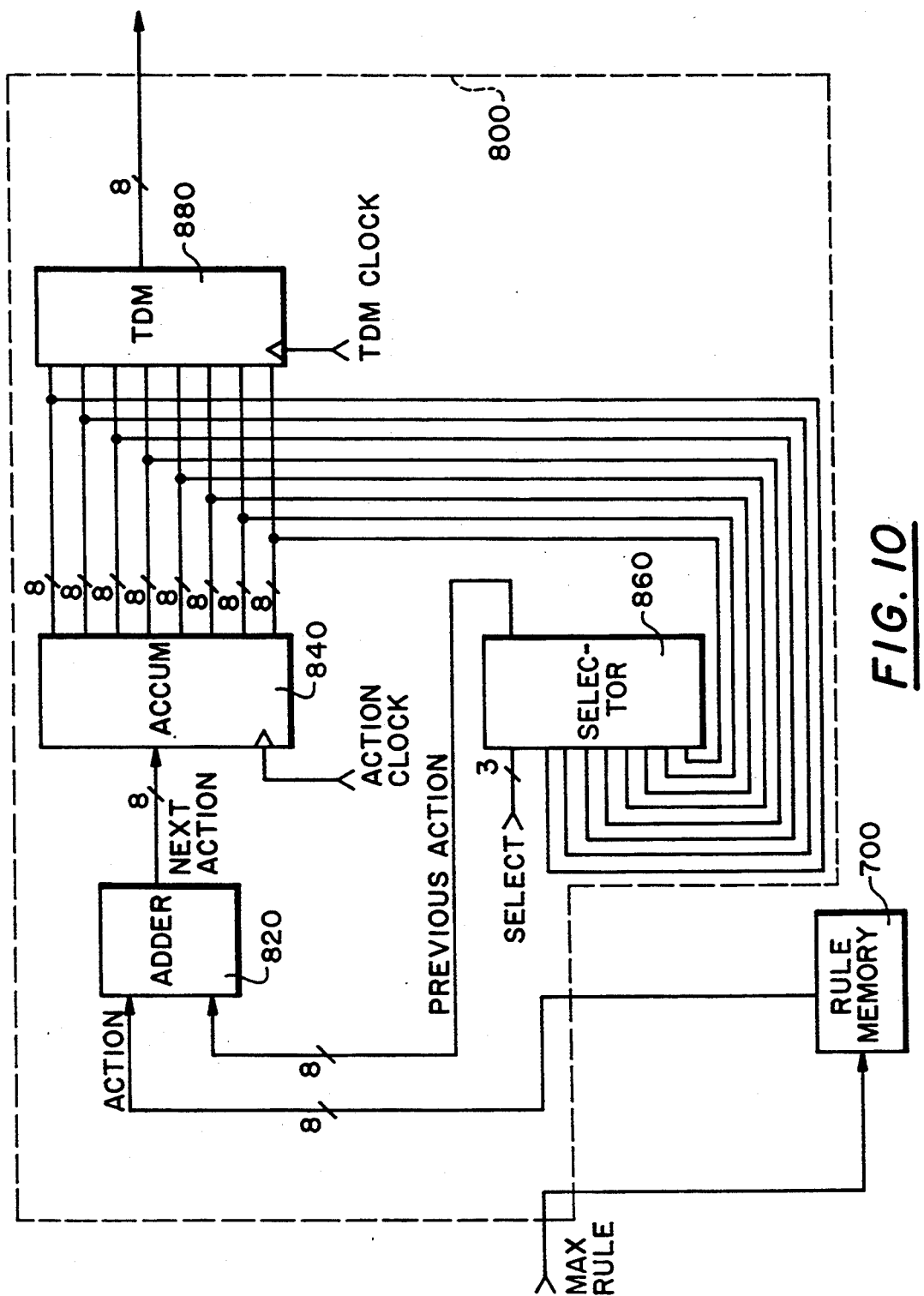
FIG. 10 discloses a block diagram of the output register of FIG. 3.

FIG. 10 discloses a block diagram of the output register 800 of FIG. 3. The MAX RULE signal from the maximum comparator 600 is supplied to the rule memory 700 in order to access the action value signal ACTION which provides the offset to be added to the existing output signal. The signal ACTION is input to an adder 820 and added to a PREVIOUS ACTION signal to obtain a NEXT ACTION signal. The NEXT ACTION signal is output to an accumulator 840, which latches the NEXT ACTION signal for the appropriate output. The output of the accumulator 840 is fed back and selected in response to a SELECT signal by a selector 860 for modification of the subsequent output.

After the accumulator 840 has latched the NEXT ACTION signal for all eight outputs, the eight outputs are time-division multiplexed by the time division multiplexer 880. The resulting 8-bit TDM signal is output, for example, to eight output devices having the capability to demultiplex the TDM signal. The 8-bit TDM signal from the time division multiplexer 880 may also be fed back to the fuzzifier input selector 100 as the Loop Back Input signal as shown in FIG. 3.

The signals ACTION CLOCK, SELECT and TDM CLK are supplied by the control circuit 900, and one skilled in the art will appreciate the application of these signals to the output register 800 in order to obtain the time-division-multiplexed output signal from the time division multiplexer 880.

Figure 12:
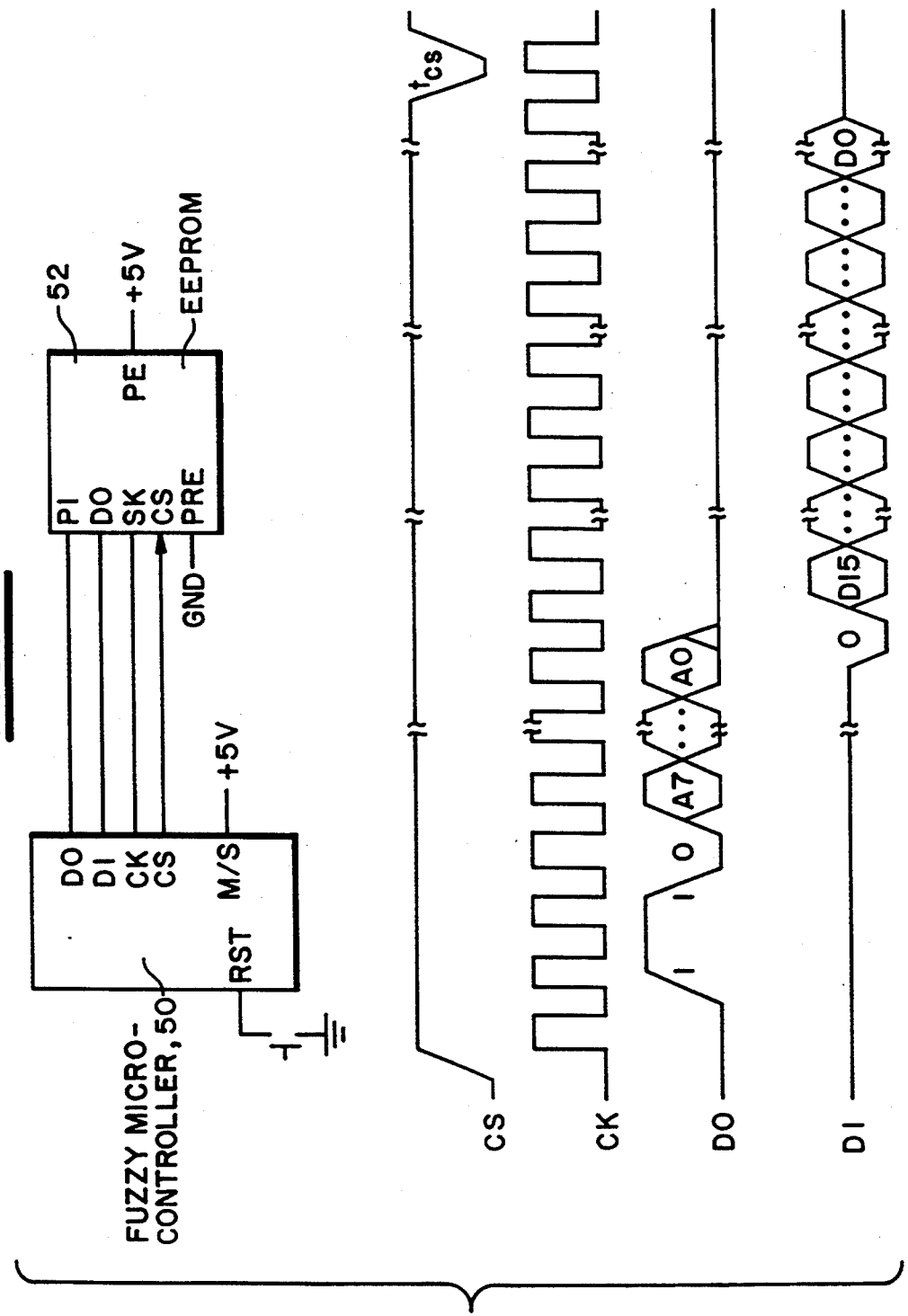
FIG. 12 illustrates an implementation of the fuzzy microcontroller of the present invention in a master mode.

The fuzzy microcontroller of the present invention can be implemented on a VLSI chip and used in a stand-alone master-control mode or may supplant a microprocessor implementation. For example, FIG. 12 illustrates an implementation of the fuzzy microcontroller 50 in a master mode. A programmable memory, such as the EEPROM 52 may store all necessary configuration data, such as fuzzy parameter data and rule data. An exemplary EEPROM would be the F93CSXX series from National Semiconductor, Inc., Sunnyvale, Calif. The master mode is set by setting the M/$\overline{S}$ terminal of the fuzzy microcontroller 50 to +5 volts and initiating by setting the RST terminal. The fuzzy microcontroller 50 outputs a chip select signal from the terminal CS, serial address data from the terminal DO, and a clock signal from the terminal CK, and receives serial data via a terminal DI. The protocol between the fuzzy microcontroller 50 and the EEPROM 52 may be, for example, the specification requirements of the 93C56 series devices from National Semiconductor, the requirements of which are incorporated herein by reference.

Such an implementation in the master mode would be advantageous in relatively inexpensive devices, such as home appliances or home heating systems.

Figure 13:
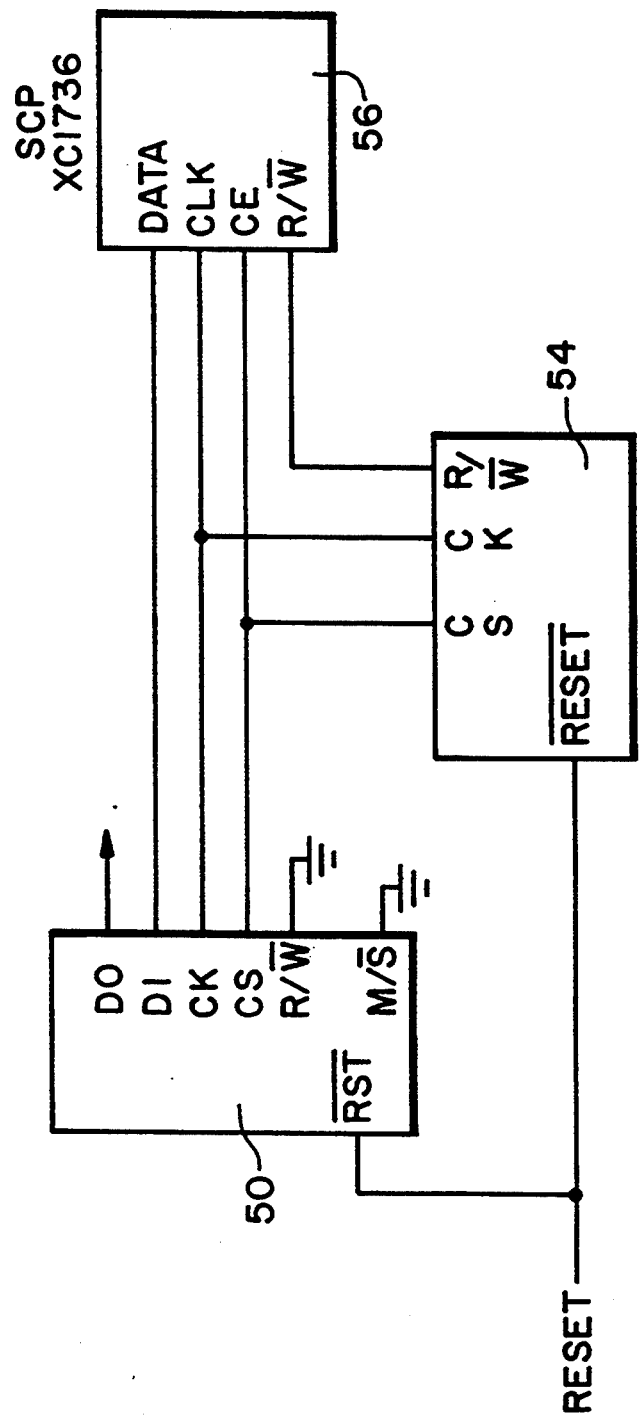
FIG. 13 illustrates an implementation of the fuzzy microcontroller of the present invention in a slave mode.
Figure 14:
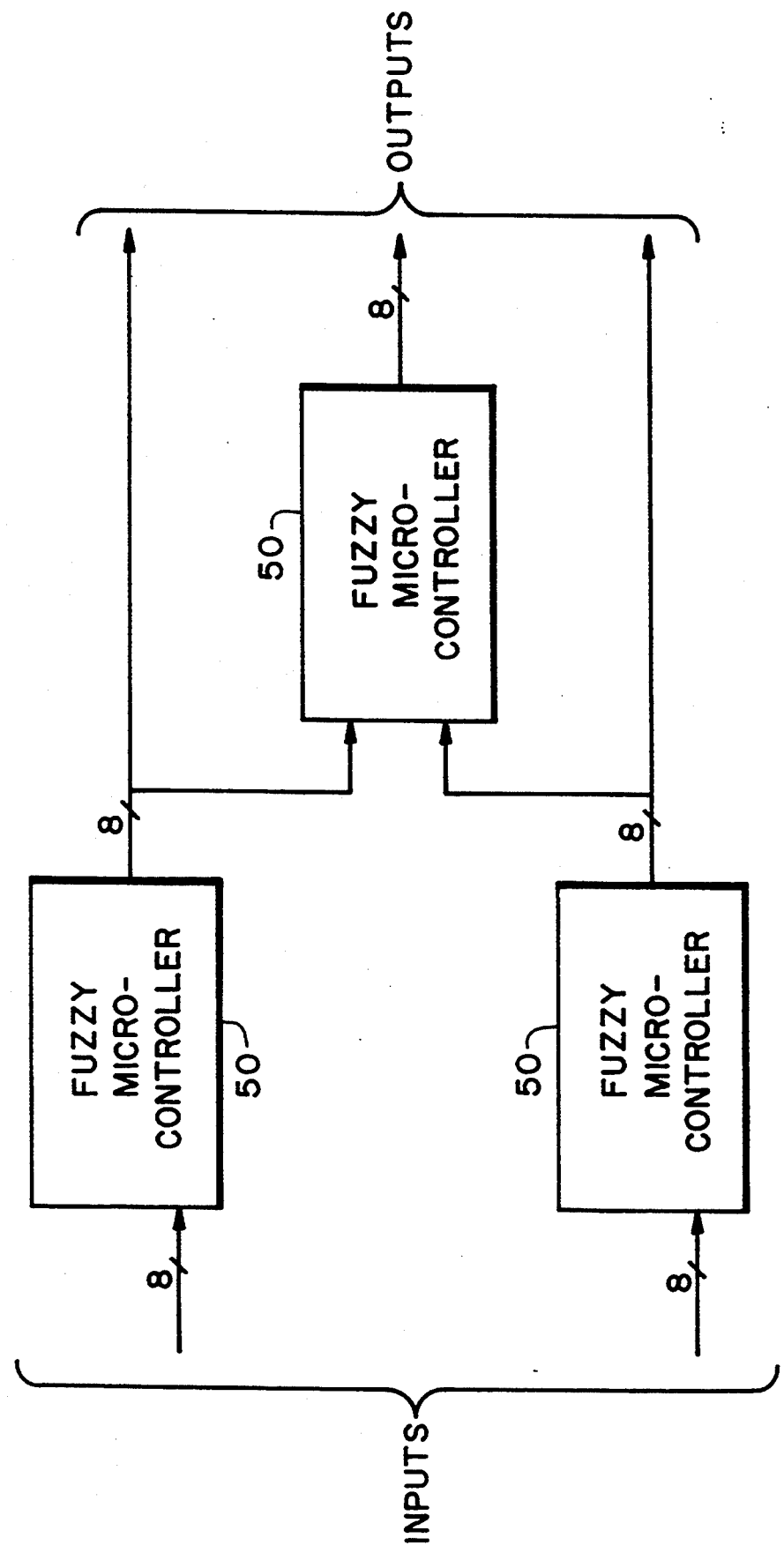
FIG. 14 illustrates a plurality of the fuzzy microcontrollers cascaded for greater processing capacity.

In more complex applications in which a microprocessor is already in use, the fuzzy microcontroller of the present invention may be implemented in a slave mode for the purposes of downloading configuration data, as shown in FIG. 13. The slave mode in the fuzzy microcontroller 50 is set by grounding the M/$\overline{S}$ terminal to zero volts; as a result, the terminals CS and CK are responsive to signals externally supplied by a microprocessor 54, which also supplies a read/write (R/$\overline{W}$) signal to the memory 56. Thus, the present invention is compatible with microprocessor-based systems, and may be reset by the microprocessor 54 as needed.

The fuzzy microcontroller of the present invention provides efficient control using fuzzy logic, with high processing rates on the order of 30 million rules/second. The fuzzy microcontroller also provides an efficient method for compressing input and output data by time division multiplexing. Further, the fuzzy microcontroller provides a fuzzifying arrangement (apparatus and method) which is easy to implement by avoiding the necessity of determining a shape of a membership function. Further, the fuzzy microcontroller provides a multipath feedforward network which asynchronously determines a minimum rule term using a minimum amount of circuitry, thereby minimizing space on an integrated circuit and reducing cost. Finally, the fuzzy microcontroller provides a novel method for determining the optimum rule among a set of rules for an output, in response to fuzzified inputs.

Figure 11A:
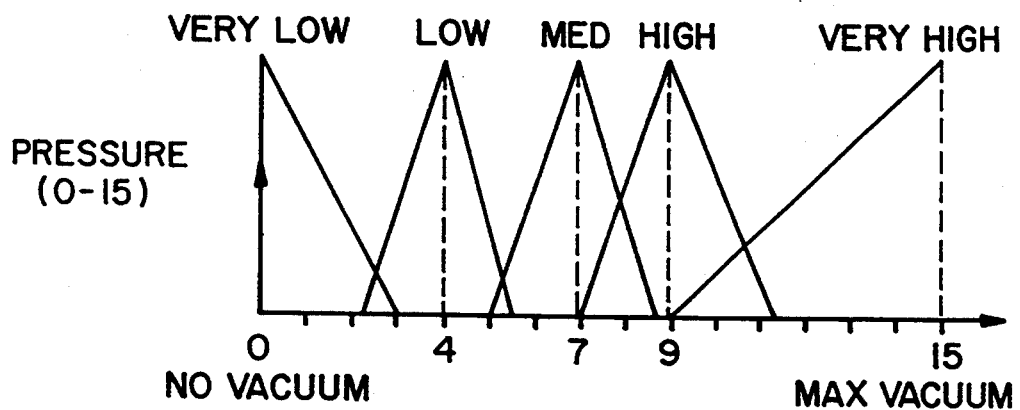
FIGS. 11A, 11B and 11C illustrate exemplary membership functions for an application of the fuzzy microcontroller of the present invention.
Figure 11B:
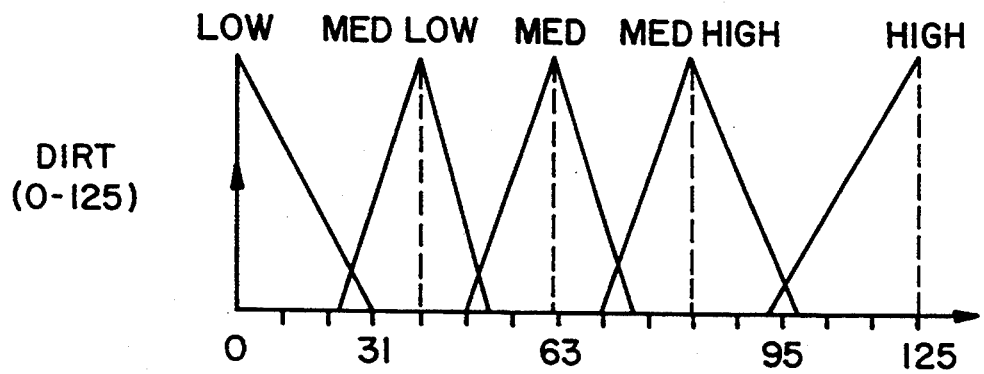
Figure 11C:
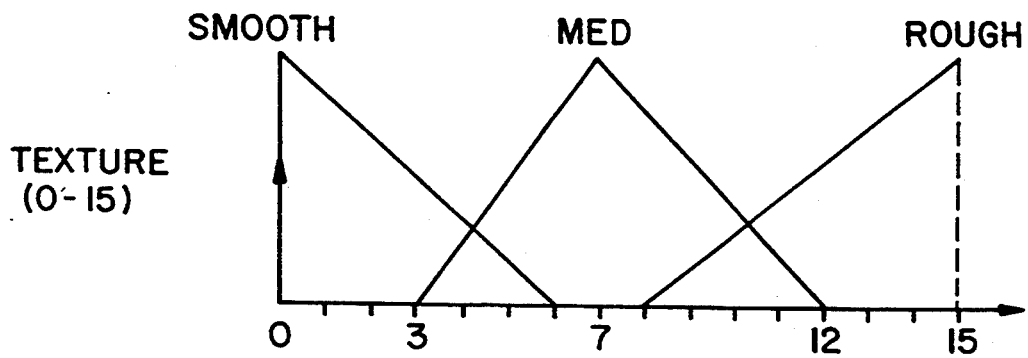

The operation of the fuzzy microcontroller of the present invention will become more apparent with reference to FIGS. 11A, 11B and 11C, which illustrate an application of the fuzzy microcontroller in controlling a vacuum cleaner. Specifically, FIGS. 11A, 11b and 11C each show an input to the fuzzy microcontroller along the X axis (e.g., pressure, dirt and texture), along with a plurality of fuzzifiers for classifying the input data.

As shown in FIG. 11A, the vacuum pressure input may be in one or more of five fuzzy sets: very low, low, medium, high or very high. Similarly, the inputs for dirt and texture (as measured by corresponding sensors) have their respective fuzzy sets as shown in FIGS. 11B and 11C, respectively.

Assuming the vacuum cleaner has three outputs to be controlled, namely VACUUM CONTROL, BEATER HEIGHT and BEATER SPEED, each output will have a number of associated rules to be applied, depending on the inputs pressure (P), dirt (D) and texture (T). Exemplary rules for the VACUUM CONTROL, BEATER HEIGHT and the BEATER SPEED are shown in Tables 3, 4 and 5, respectively.

TABLE 3

VACUUM CLEANER EXAMPLE
VACUUM CONTROL RULES

1. If (D is High) and (T is Rough) and (P is Low) then (Big Increment)
2. If (D is MHigh) and (T is Rough) and (P is Low) then (Increment)
3. If (D is MLow) and (T is Smooth) and (P is High) then (Decrement)
4. If (D is Low) and (T is Smooth) and (P is High) then (Big Decrement)
5. If (D is Low) and (P is High) then (Big Decrement)

TABLE 4

BEATER HEIGHT RULES

1. If (T is Smooth) and (D is High) then (Big Raise)
2. If (T is Smooth) and (D is MHigh) then (Raise)
3. If (T is Med) and (D is MHigh) then (Raise)
4. If (T is Med) and (D is MLow) then (Lower)
5. If (T is Smooth) and (D is Low) then (Big Lower)
6. If (T is Rough) and (D is MHigh) then (Raise)
7. If (T is Rough) and (D is High) then (Big Raise)
8. If (T is Smooth) and (D is MLow) then (Lower)

TABLE 5

BEATER SPEED RULES

1. If (T is Smooth) and (D is Low) then (Big Decrement Speed)
2. If (T is Med) and (D is Low) then (Decrement Speed)
3. If (T is Med) and (D is MHigh) then (Increment Speed)
4. If (T is Med) and (D is High) then (Big Increment Speed)
5. If (T is Rough) and (D is MHigh) then (Big Increment Speed)
6. If (T is Rough) and (D is High) then (Big Increment Speed)

The fuzzy microcontroller inputs the crisp inputs for pressure dirt and texture, and thereafter fuzzifies the data in accordance with the membership functions shown in FIGS. 11A–11C. The fuzzy microcontroller then determines the minimum rule term for each rule, and then determines the relative maximum of the minimum rule for each output. For example, assuming the input values for pressure, dirt and texture were "8", "40" and "5", respectively, the minimum comparator 500 and maximum comparator 600 would provide the following results as shown in Table 6 for the VACUUM CONTROL output.

TABLE 6

| Rule | Rule Term | Center − Input = Diff | Width | M | Min | Max of Min |
|---|---|---|---|---|---|---|
| 1. | D is High | 125 − 40 = 35 | 31 | 0 | | |
| | T is Rough | 15 − 5 = 10 | 7 | 0 | | |
| | P is Low | 4 − 8 = 4 | 2 | 0 | 0 | 0 |
| 2. | D is MHigh | 82 − 40 = 42 | 15 | 0 | | |
| | T is Rough | 15 − 5 = 10 | 7 | 0 | | |
| | P is Low | 4 − 8 = 4 | 2 | 0 | 0 | 0 |
| 3. | D is MLow | 40 − 40 = 0 | 15 | 31 | 0 | 0 |
| | T is Smooth | 0 − 5 = 5 | 6 | 26 | | |
| | P is High | 9 − 8 = 1 | 2 | 30 | 26 | 26 |
| 4. | D is Low | 0 − 40 = 40 | 31 | 0 | | |
| | T is Smooth | 0 − 5 = 5 | 6 | 26 | | |
| | P is High | 9 − 8 = 1 | 2 | 30 | 0 | 26 |
| 5. | D is Low | 0 − 40 = 40 | 31 | 0 | | |
| | P is High | 9 − 8 = 8 | 2 | 30 | 0 | 26 |

As shown in Table 6 with respect to Rule 1, the inputs dirt, texture and pressure are not within the respective membership function widths for HIGH, ROUGH and LOW, respectively; as a result, the corresponding membership value μ (designated M in Table 6) for these fuzzy sets is forced to zero. However, the inputs do fall within the membership function widths for MLOW, SMOOTH and HIGH as shown for Rule 3 in Table 6. Since the minimum rule term for Rule 3 is "26", and since it is the relative maximum of minimum, the Rule 3 is selected as the optimal output for the output.

According to the present invention, the method of fuzzifying a crisp input may be easily implemented in an IC chip by determining the distance between the crisp input and the center of the respective membership function; if the distance is less than the width of the membership function, then the distance value is complemented to determine the alpha cut, or the membership value of the crisp input with respect to that fuzzy set. Since the shape of the membership function for the fuzzy set need not be determined, the fuzzifying method of the present invention can be easily implemented, which results in substantial cost savings in design development and circuit implementation.

The fuzzifier of the present invention includes an input control processor, a fuzzification interface, a programmable rule base, programmable or otherwise variable decision-making logic, a defuzzification interface, a configurable feed back path, an output control processor, or peripheral pre- and post-processing circuitry.

Although the membership function shapes of the preferred embodiment had a unitary, one-to-one slope, resembling an isosceles triangle, those skilled in the art of fuzzy logic will appreciate that other membership function shapes, such as a scalene triangle, can be obtained by multiplying two fuzzy sets together having different centers and widths, whereby one fuzzy set has a TRUE polarity and another set has the opposite, or INVERSE polarity, as shown in FIGS. 5C and 5D.

The method of expanding input signals for mapping to a fuzzy set, and compressing output signals by time-division multiplexing enables the fuzzy control of a plurality of outputs on the basis of a corresponding plurality of inputs, thereby providing a more efficient control system. It will be recognized that the fuzzy microcontroller of the present invention is not limited to digital time-division multiplexed input and output signals. Rather, the present invention may be varied to include: singular or multiple inputs; bit serial or parallel formatted input data; multiplexed or non-multiplexed inputs; any means to connect the inputs to a selected fuzzification circuit; digital inputs having any number of bits of resolution; analog or digital inputs, or both mixed.

In addition, the fuzzy microcontroller of the present invention can be implemented in a cascaded arrangement, as shown in FIG. 15 in order to provide greater processing capacity for a larger number of inputs, outputs, or both. Those skilled in the art will realize the technique of controlling a plurality of the fuzzy microcontrollers in such a cascaded arrangement.

Those skilled in the art of fuzzy logic will also appreciate that the programmable rule base for an output can include, but not be limited to have any number of rules, any number of terms in a rule, the use of any or all logical functions as sentence connective operators, a permanent or volatile rule memory with on-chip or external rule storage.

Finally, those skilled in the art of fuzzy logic will appreciate that techniques for the determination of an optimum output, also known as "defuzzification" include but are not limited to defuzzification by the Mean of Maximum method, the Maximum method, the Center of Area or Center of Gravity methods, or equivalent methods thereof.

Although not as efficient, one skilled in the art will appreciate that the multipath feedforward network of the present invention may be replaced with a neural network having the input weights and the threshold values of each neuron adjusted accordingly.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A multipath feedforward network for determining an optimum term from a plurality of input signals, comprising:

a plurality of minimizing elements corresponding to said input signals, respectively, said minimizing elements each receiving said corresponding input signals and a feedback signal, each of said minimizing elements outputting a minimum output signal, said minimum output signal having lower order bits disabled when a corresponding significant bit of said input signal is different from a corresponding significant bit of said feedback signal indicating said feedback signal has a value less than a corresponding value of said input signal; and means for successively comparing corresponding significant bits of said minimum output signals of said respective minimizing elements and outputting said feedback signal in response thereto, said feedback signal representing, upon stabilization of said multipath feedforward network, said optimum term.

2. A multipath feedforward network as recited in claim 1, wherein each of said minimizing elements comprises:

a first network layer for comparing corresponding significant bits of said corresponding input signal and said feedback signal, said first network layer outputting a disabling signal for said lower order bits when said corresponding significant bit of said input signal is different from said corresponding bit of said feedback signal; and an output network layer for outputting said compared bits of said corresponding input signal as said minimum output signal in accordance with said disabling signal, said output network layer outputting said input signal if, upon said stabilization, said output network layer has not received said disabling signal.

3. A multipath feedforward network as recited in claim 2, wherein said means for successively comparing comprises a plurality of NAND gates corresponding to each significant bit of said minimum output signals of said minimizing elements, each of said NAND gates outputting a corresponding significant bit of said feedback signal, said NAND gates determining a difference in value in said respective significant bits of said optimum output signals.

4. A multipath feedforward network as recited in claim 1, wherein said means for successively comparing comprises a plurality of NAND gates corresponding to each significant bit of said minimum output signals of said minimizing elements, each of said NAND gates outputting a corresponding significant bit of said feedback signal, said NAND gates determining a difference in value in said respective significant bits of said optimum output signals.

5. A multipath feedforward network as recited in claim 1, further comprising means for inverting each of said inputs of said corresponding minimizing elements, said optimum term thereby being a maximum value.

6. A multipath feedforward network as recited in claim 1, wherein said optimum term is a minimum value.

7. A multipath feedforward network as recited in claim 1, wherein said minimizing elements output the respective minimum output signals in parallel.

8. A multipath feedforward network as recited in claim 7, wherein said multipath feedforward network operates asynchronously.

* * * * *